United States Patent
Vangal et al.

(10) Patent No.: US 7,324,540 B2
(45) Date of Patent: Jan. 29, 2008

(54) NETWORK PROTOCOL OFF-LOAD ENGINES

(75) Inventors: Sriram R. Vangal, Aloha, OR (US); Yatin Hoskote, Portland, OR (US); Vasantha K. Erraguntla, Beaverton, OR (US); Jianping Xu, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 1122 days.

(21) Appl. No.: 10/334,733

(22) Filed: Dec. 31, 2002

(65) Prior Publication Data

US 2004/0125751 A1    Jul. 1, 2004

(51) Int. Cl.
   *H04L 12/56* (2006.01)
(52) U.S. Cl. ............... 370/419; 370/463; 709/226
(58) Field of Classification Search ........... 370/378, 370/386, 412–18, 419, 463, 237, 229, 230, 370/238; 709/250, 226, 213, 205
See application file for complete search history.

(56) References Cited

U.S. PATENT DOCUMENTS

| | | | |
|---|---|---|---|
| 4,782,439 A | 11/1988 | Borkar et al. | 710/23 |
| 4,975,929 A | 12/1990 | Apple et al. | 375/373 |
| 5,047,922 A | 9/1991 | Borkar | 710/2 |
| 5,546,023 A | 8/1996 | Borkar et al. | 326/93 |
| 5,602,845 A | 2/1997 | Wahl | 370/395.7 |
| 5,613,071 A | 3/1997 | Rankin et al. | 707/10 |
| 5,937,169 A | 8/1999 | Connery et al. | 709/250 |
| 6,061,362 A | 5/2000 | Muller et al. | 370/463 |
| 6,075,392 A | 6/2000 | Sandner | 327/145 |
| 6,112,309 A | 8/2000 | Inoue et al. | 713/501 |
| 6,195,353 B1 | 2/2001 | Westberg | 370/230.1 |
| 6,246,684 B1 | 6/2001 | Chapman et al. | 370/394 |
| 6,272,621 B1 | 8/2001 | Key et al. | 712/200 |
| 6,373,289 B1 | 4/2002 | Martin et al. | 326/93 |
| 6,385,211 B1 | 5/2002 | Williams et al. | 370/469 |
| 6,415,388 B1 | 7/2002 | Browning et al. | 713/322 |
| 6,434,620 B1 | 8/2002 | Boucher et al. | 709/230 |
| 6,438,609 B1 | 8/2002 | Geiner | 455/456.1 |
| 6,473,425 B1 | 10/2002 | Bellaton et al. | 370/392 |
| 6,701,339 B2 | 3/2004 | Vangal et al. | 708/709 |
| 6,735,218 B2 | 5/2004 | Chang et al. | 370/471 |
| 6,741,107 B2 | 5/2004 | Borkar et al. | 327/153 |
| 6,751,194 B1 | 6/2004 | Ueno | 370/235 |
| 6,823,437 B2 | 11/2004 | Boyd et al. | 711/170 |
| 6,847,617 B2 | 1/2005 | Borkar et al. | 370/258 |

(Continued)

FOREIGN PATENT DOCUMENTS

EP    0 757 495 A1    2/1997

(Continued)

OTHER PUBLICATIONS

CPEL0353169 First Chinese Office Action.

(Continued)

*Primary Examiner*—John Pezzlo
(74) *Attorney, Agent, or Firm*—Grossman, Tucker, Perreault & Pfleger, PLLC

(57) ABSTRACT

The disclosure describes techniques for coordinating operation of multiple network protocol off-load engines (e.g., Transport Control Protocol (TCP) off-load engines).

37 Claims, 19 Drawing Sheets

U.S. PATENT DOCUMENTS

| | | | |
|---|---|---|---|
| 6,853,644 B1 | 2/2005 | Vangal et al. | 370/419 |
| 7,174,393 B2 * | 2/2007 | Boucher et al. | 709/250 |
| 7,181,544 B2 * | 2/2007 | Vangal et al. | 709/250 |
| 2001/0023460 A1 | 9/2001 | Boucher et al. | 709/250 |
| 2001/0055464 A1 | 12/2001 | Miyaki et al. | 386/46 |
| 2002/0087732 A1 | 7/2002 | Boucher et al. | 709/250 |
| 2002/0095512 A1 | 7/2002 | Rana et al. | 709/232 |
| 2002/0112143 A1 | 8/2002 | Matsuura et al. | 712/25 |
| 2002/0172229 A1 | 11/2002 | Parvin et al. | 370/521 |
| 2003/0076822 A1 * | 4/2003 | Shalom et al. | 370/378 |
| 2003/0154227 A1 | 8/2003 | Howard et al. | 708/495 |
| 2004/0039954 A1 | 2/2004 | White et al. | 713/322 |
| 2004/0042458 A1 | 3/2004 | Elzu | 370/394 |
| 2004/0042483 A1 | 3/2004 | Elzur | 370/463 |
| 2004/0055464 A1 | 3/2004 | Lamprecht et al. | 95/23 |
| 2005/0165985 A1 | 7/2005 | Vangal et al. | 710/107 |
| 2005/0226238 A1 | 10/2005 | Hoskote et al. | 370/389 |
| 2005/0286655 A1 | 12/2005 | Narendra et al. | 375/318 |

FOREIGN PATENT DOCUMENTS

| | | |
|---|---|---|
| JP | 9 64843 | 7/1997 |

OTHER PUBLICATIONS

PCT/US03/27265 Written Opinion dated Oct. 29, 2004.

Internet Protocol, DARPA Internet Program, Protocol Specification, rfc0791, Information Sciences Institute, University of Souther California, US, Sep. 1981, 46 pages.

Alacritech 1000X2 Gigabit Adapter; 2002; 2 pages.

EZ Chip Technologies, Network Processor Designs for Next Generation Networking Equipment, Dec. 27, 1999.

Altera, Increasing System Bandwidth with CDS, Version 1 Jun. 2001.

Intel Being Licensed for TOE Technology.

R.Braden, "Requirements for Internet Hosts—Communiction Layers", Internet Engineering Task Force, Oct. 1989, Network Working Group, pp. 1-116.

V. Jacobson, et al., "TCP Extensions for High Performance", Network Working Group, RFC 1072, RFC 1185, May 1992, pp. 1-37.

"Transmission Control Protocol", Darpa Internet Program, Protocol Specification, Sep. 1981, RFC 793, 89 Pgs.

"Accelerating Server and Application Performance", The Next Generation of Network Connectivity, Alacritech 2000, 14 Pgs.

Boon S. Ang, "An Evaluation of an Attempt of Offlaoding TCP/IP Protocol Processing onto an i960RN-baased iNIC", Hewlett Packard 2001, pp. 1-33.

"BCM5700 10/100/1000 PCI-X Controller Software Suite", BCM5700 Software Suite Probuct Brief, Broadcom Corporation 2000, 2 Pgs.

"Optistar GE1000 With Transport Acceleration", High Performance Gigabit Ethernet Network Adapter Featuring Full Transport Protocol Offload, Lucent Technologies Inc. 2001, 2 Pgs.

"Alacritech 1000x1 Gigabit Adapter", The Accelerating Convergence of Networking and Storage, Alacritech, Inc. 2002, 2 Pgs.

"Silverback iSNAP 2100", IP Storage Network Access Processor, Silverback Systems 2002, 2 Pgs.

"SNP-1000i Dual Port TCP Offload Engine", Trebia Networks 2002, The Storage Network Processor Company, 2 Pgs.

"ANA-7711 TCP/IP Offload Adapter", file://C:/Windows/TEMP/AdaptecANA-7711 TCP-IP Offload Adapter.htm, 2 pgs.

* cited by examiner

| Instruction | Operands |
|---|---|
| LOAD | regA <-- data |
| MOV | regA --> regB |
| AND / OR | regA regB --> cond |
| ADD / SUB | regA regB --> regC |
| CMP / EQUAL | regA regB --> cond |
| NOT | regA --> regC |
| BREQZ/BRNEQZ/JMP | label |
| SHL2 | regA |
| CAM1CLR | index |
| TCBWR | index |

FIG. 8

NETWORK PROTOCOL OFF-LOAD ENGINES

REFERENCE TO RELATED APPLICATIONS

This application relates to the following co-pending applications: "NETWORK PROTOCOL ENGINE", U.S. Ser. No. 10/234,392, filed Sep. 3, 2002; "PACKET-BASED CLOCK SIGNAL", U.S. Ser. No. 10/234,489, filed Sep. 3, 2002; and "TRACKING OUT-OF-ORDER PACKETS", U.S. Ser. No. 10/234,493, filed Sep. 3, 2002.

REFERENCE TO APPENDIX

This application includes an appendix, Appendix A, of micro-code instructions. The authors retain applicable copyright rights in this material.

BACKGROUND

Networks enable computers and other electronic devices to exchange data such as e-mail messages, web pages, audio data, video data, and so forth. Before transmission across a network, data is typically distributed across a collection of packets. A receiver can reassemble the data back into its original form after receiving the packets.

In addition to the data ("payload") being sent, a packet also includes "header" information. A network protocol can define the information stored in the header, the packet's structure, and how processes should handle the packet.

Different network protocols handle different aspects of network communication. Many network communication models organize these protocols into different layers of a protocol stack. For example, models such as the Transmission Control Protocol/Internet Protocol (TCP/IP) model and the Open Software Institute (OSI) model define protocol stacks that include a "physical layer" that handles signal transmission over physical media; a "link layer" that handles the low-level details of providing reliable data communication over physical connections; a "network layer", such as the Internet Protocol, that can handle tasks involved in finding a path through a network that connects a source and destination; and a "transport layer" that can coordinate end-point to end-point communication while insulating "application layer" programs from the complexity of network communication.

A different network communication model, the Asynchronous Transfer Mode (ATM) model, is used in ATM networks. The ATM model also defines a physical layer, but defines ATM and ATM Adaptation Layer (AAL) layers in place of the network, transport, and application layers of the TCP/IP and OSI models.

Generally, to send data over the network, different headers are generated for different protocol stack layers. For example, in TCP/IP, a transport layer process generates a transport layer packet (sometimes referred to as a "segment") by adding a transport layer header to a set of data provided by an application; a network layer process then generates a network layer packet (e.g., an IP packet) by adding a network layer header to the transport layer packet; a link layer process then generates a link layer packet (also known as a "frame") by adding a link layer header to the network packet; and so on. By analogy, this process is much like stuffing a series of envelopes inside one another.

After the packet(s) travel across the network, the receiver can proceed in the reverse of the above (e.g., "unstuff" the envelopes). For example, the receiver's link layer process can verify the received frame and pass the enclosed network layer packet(s) to the network layer of the protocol stack. The network layer can use the network header to verify proper delivery of the packet(s) and pass enclosed transport segment(s) to the transport layer of the protocol stack. Finally, the transport layer process can process the transport packet based on the transport header and pass the resulting data to an application.

As described above, both senders and receivers have quite a bit of processing to do to handle network communication. Additionally, network connection speeds continue to increase rapidly. For example, network connections capable of carrying 10-gigabits per second and faster may soon become commonplace. This increase in network connection speeds imposes important design issues for devices offering such connections. That is, at such speeds, an inadequately designed device may become overwhelmed with a deluge of network traffic.

BRIEF DESCRIPTION OF THE DRAWINGS

FIG. 8 is a chart of an instruction set for programming network protocol operations.

DETAILED DESCRIPTION

Many computer systems and other host devices feature processors (e.g., general purpose Central Processing Units (CPUs)) that handle a wide variety of tasks. Often these processors have the added responsibility of handling network traffic. The increases in network traffic and connection speeds have placed growing demands on host processor resources. To at least partially reduce the burden of network communication, a network protocol "off-load" engine can perform network protocol operations for one or more hosts. An engine can perform operations for a wide variety of protocols. For example, an engine can be configured to perform operations for transport layer protocols (e.g., TCP, User Datagram Protocol (UDP), and Real-Time Transport Protocol (RTP)), network layer protocols (e.g., IPv4 and IPv6), and/or application layer protocols (e.g., sockets programming). Similarly, in Asynchronous Transfer Mode (ATM) networks, the engine 100 can be configured to provide ATM layer or ATM Adaptation Layer (AAL) layer operations for ATM packets (also referred to as "cells").

In addition to conserving host processor resources by handling protocol operations, an engine may potentially provide "wire-speed" processing, even for very fast connections such as 10-gigabit per second and 40-gigabit per second connections (e.g., an Ethernet, OC-192, or OC-768 connection). In other words, the engine may, generally, complete processing of one packet before another arrives. By keeping pace with a high-speed connection, an engine 100 can potentially avoid or reduce the cost and complexity associated with queuing large volumes of backlogged packets.

While network off-load engines can ease the burden of handling network operations on host systems, an engine may support a limited number of connections (e.g., transport layer or ATM connections). For example, while an engine have resources to support 128-connections, a given host system may be expected to support hundreds to thousands of connections at a time.

Figure 1:
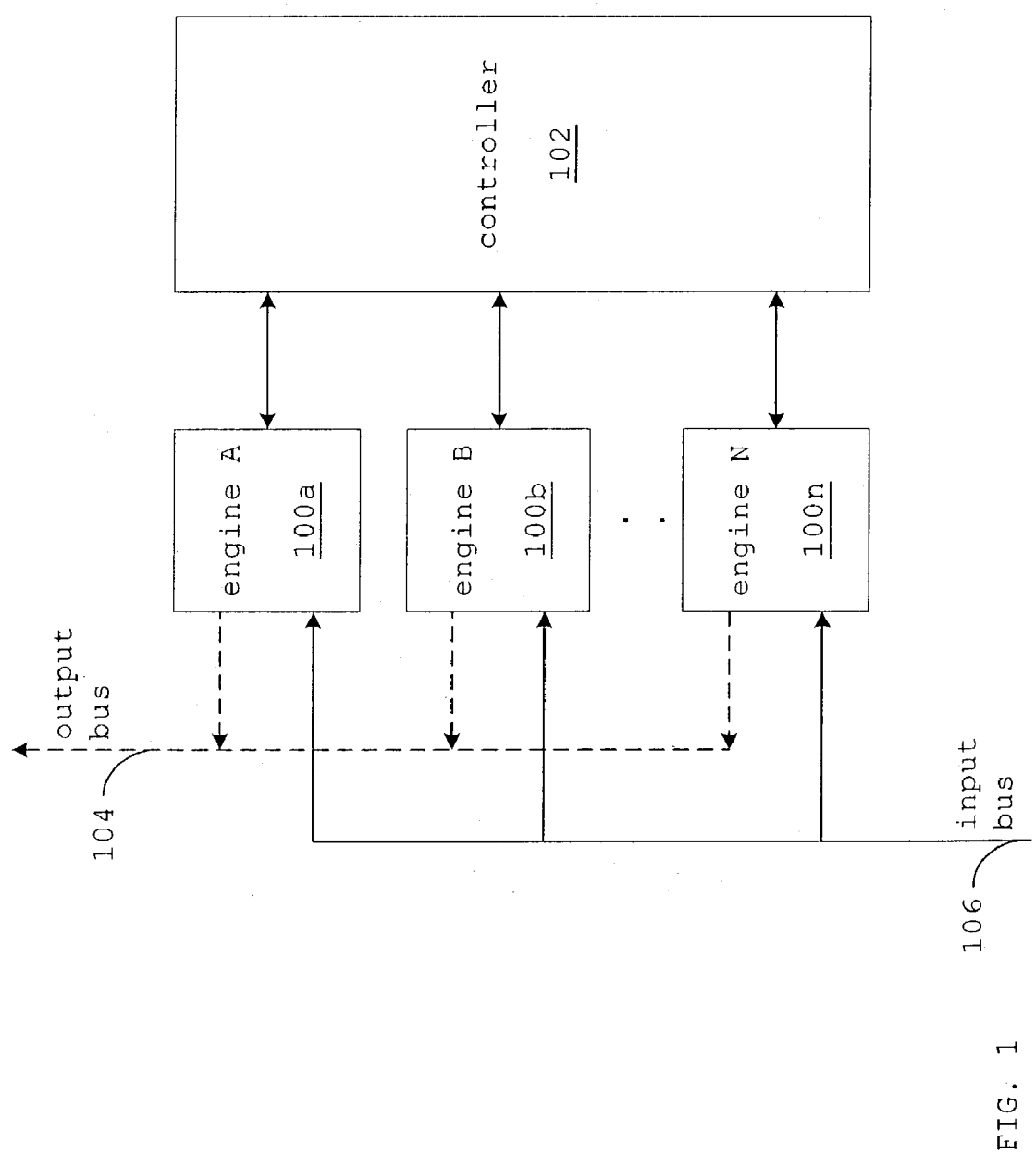
FIG. 1 is a diagram illustrating a collection of off-load engines.

FIG. 1 illustrates a scheme that aggregates multiple off-load engines 100a-100n. Thus, instead of C-connections supported by a single engine, the n-aggregated engines 100a-100n can support n×C connections. In the scheme illustrated, a controller 102 distributes responsibility for handling different network connections across the different engines 100. For example, the controller 102 can concentrate the allocation of connections to a minimal number of engines. This can reduce power consumption and heat-generation of the system by reducing the activity of inactive engines 100a-100n.

In greater detail, engines 100a-100n include an interface to receive packets over data lines 106. These data lines 106 may carry, for example, the output of an Ethernet medium access controller (MAC) or Synchronous Optical Network (SONET) framer. As shown, the engines 100a-100n output the results of the network operations performed by an engine via an interface to a bus 104 that leads, for example, to a host system.

The controller 102 coordinates operation of the engines 100. For example, when a packet arrives that identifies a connection not previously seen, the controller 102 can allocate an engine 100 for handling packets of the new connection. In addition to allocating connections, the controller 102 can limit access to the shared bus 104 to the engine 100 allocated for the connection of a packet being processed. In addition to these tasks, controller 102 may also selectively enable and disable different engines 100 under different circumstances described below. Again, this can potentially save power and decrease heat generated by the collection of engines 100.

The scheme illustrated in FIG. 1 may be implemented in a wide variety of ways. For example, the controller 102 may maintain data identifying which engine 100 has been allocated for different connections. Instead of a centralized approach, however, the controller 102 and engines 100 may instead coordinate engine 100 usage via engine/controller communication. For example, FIG. 2 illustrates an example of communication via engine 100 and controller 102 interfaces.

Figure 2:
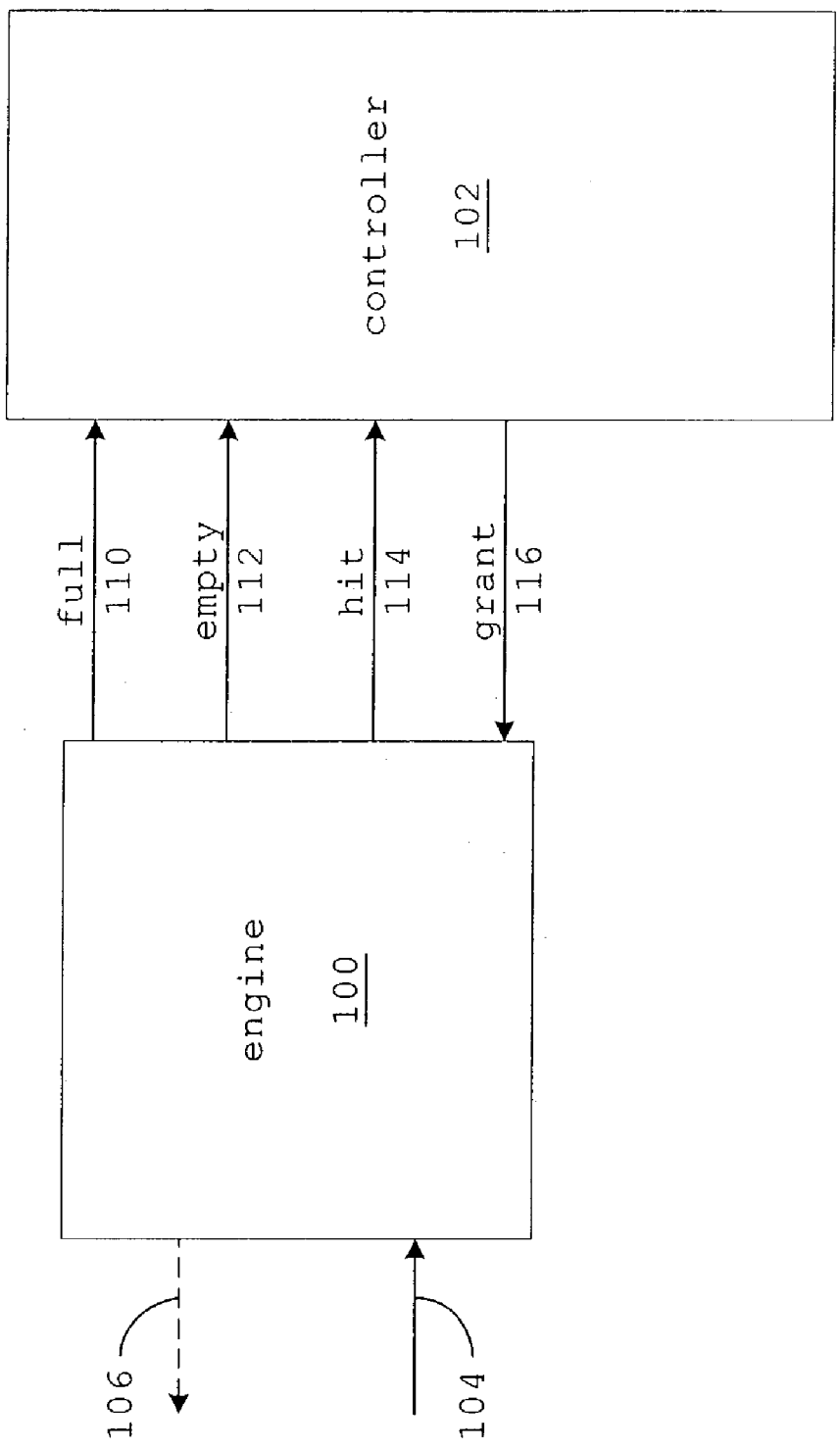
FIG. 2 is a diagram illustrating communication between an off-load engine and a controller.

In the example shown in FIG. 2, the engine 100 stores data identifying connections allocated to the engine 100. During arrival of a packet, active engines 100 (engines allocated to at least one on-going connection) receive a "grant" 116 signal from the controller 102. The "grant" 116 signal enables the engine 100 to lookup the packet's connection in its connection data. If the engine's 100 lookup succeeds, the engine 100 can signal a "hit" 114 to the controller 102. In response to receiving the "hit" signal 114, the controller 102 grants control of the output bus 106 to the allocated engine 100 by temporarily de-asserting the "grant" 116 signal to other currently active engines 100 for the duration of the engine's 100 processing of the packet. The de-assertion not only assures bus 104 control by the allocated engine 100, but can save power otherwise consumed by the other engines. After the engine 100 completes its packet processing operations, the controller 102 reasserts the grant signal 116 to engines serving at least one on-going connection in preparation for the next packet.

Potentially, in the case of a packet signaling the start of a new connection, no engine 100 will signal a "hit" for the packet. Thus, the controller 102 allocates the connection to one of the engines 100. The controller 102 may implement an allocation scheme based on current engine 100 usage. To provide the controller 102 with information about the engine's 100 current usage, the engine 100 can output a "full" signal 110 that identifies when the engine 100 cannot handle additional connections. In response to a "full" signal 10, the controller 102 may select a different engine to use when a new connection needs to be allocated.

As shown, the engine 100 can also output an "empty" 112 signal when the engine 100 does not currently handle an active connection. For example, as connections terminate, the connections are correspondingly deallocated from the corresponding engine. Eventually, an engine may not service any on-going connections and may assert the "empty" 112 signal. In response, the controller may de-assert the grant signal until the engine is pressed into service again.

The signals depicted in FIG. 2 are merely illustrative and different implementations may communicate differently. For example, instead of "empty" 112 and "full" 110 signals, the engine 100 may report a number of connections currently handled, percent capacity used, or another capacity metric.

Figure 3:
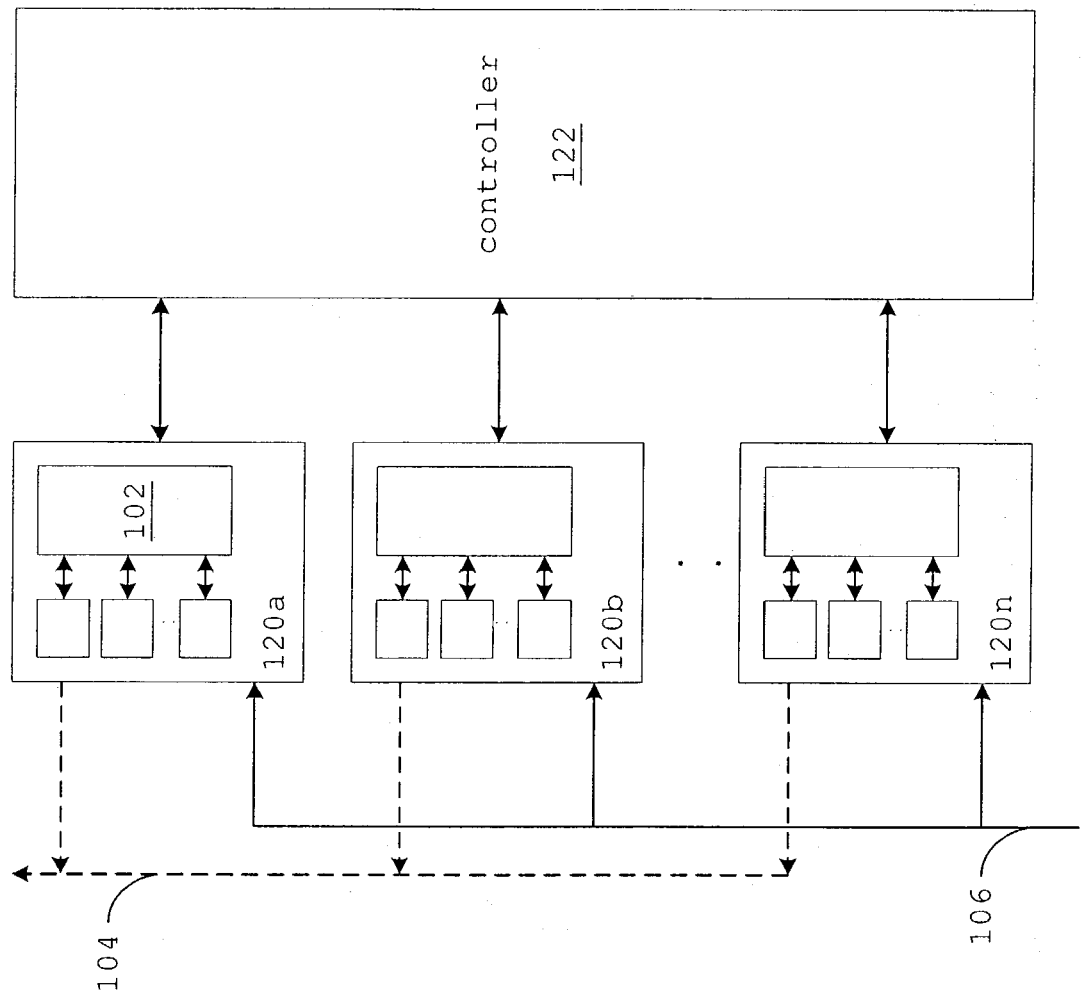
FIG. 3 is a diagram illustrating a hierarchy of engine controllers.

FIG. 1 illustrated a controller 102 that managed n off-load engines 100. The number of engines 100 managed (e.g., 8) may be limited, for example, to ease arbitration between the controller 102 and engines 100. To increase the number of engines 100 and the number of connections handled by a system, FIG. 3 depicts a hierarchical aggregation of the scheme shown in FIG. 1. That is, instead of controlling a collection off-load engines 100, a hierarchical controller 122 manages other controllers 102. Thus, instead of providing (n-engines×C-connections/engine), the scheme can support (g-groups of engines×n-engines/group×C-connections/engine).

The interaction between the groups 120 and the controller 122 may be much the same as those shown in FIG. 2. For example, a group 120 may identify when the group's collection of engines is "full" or "empty" and whether an engine within the group 120 has been allocated to handle the connection of a current packet. Similarly, the hierarchical controller 122 may allocate new connections to a particular group 120, grant control of the output bus 104 to a particular group 120, and so forth. For example, when an engine in a group 120 identifies a "hit" for a packet's connection (e.g., the connection has been allocated to the engine), the engine may signal a "hit" to the group's controller 102 which, in turn, signals a "hit" to the hierarchical controller 122. In response, the hierarchical controller 122 can send a grant signal to the group's controller 102 which, in turn, sends a grant signal to the particular engine reporting the hit.

The scheme shown in FIG. 3 is scalable and can be used to pool a very large number of engines. Additionally, while FIG. 3 illustrates a "two-deep" hierarchy, the controller hierarchy may recursively repeat at many different levels. That is, a hierarchical controller may coordinate a group of a hierarchically lower hierarchical controllers, and so forth. Again, communication between the hierarchical controllers may use the scheme illustrated in FIG. 2 (e.g., by communicating "hit", "full", "empty", and/or "grant" signals).

Figure 4:
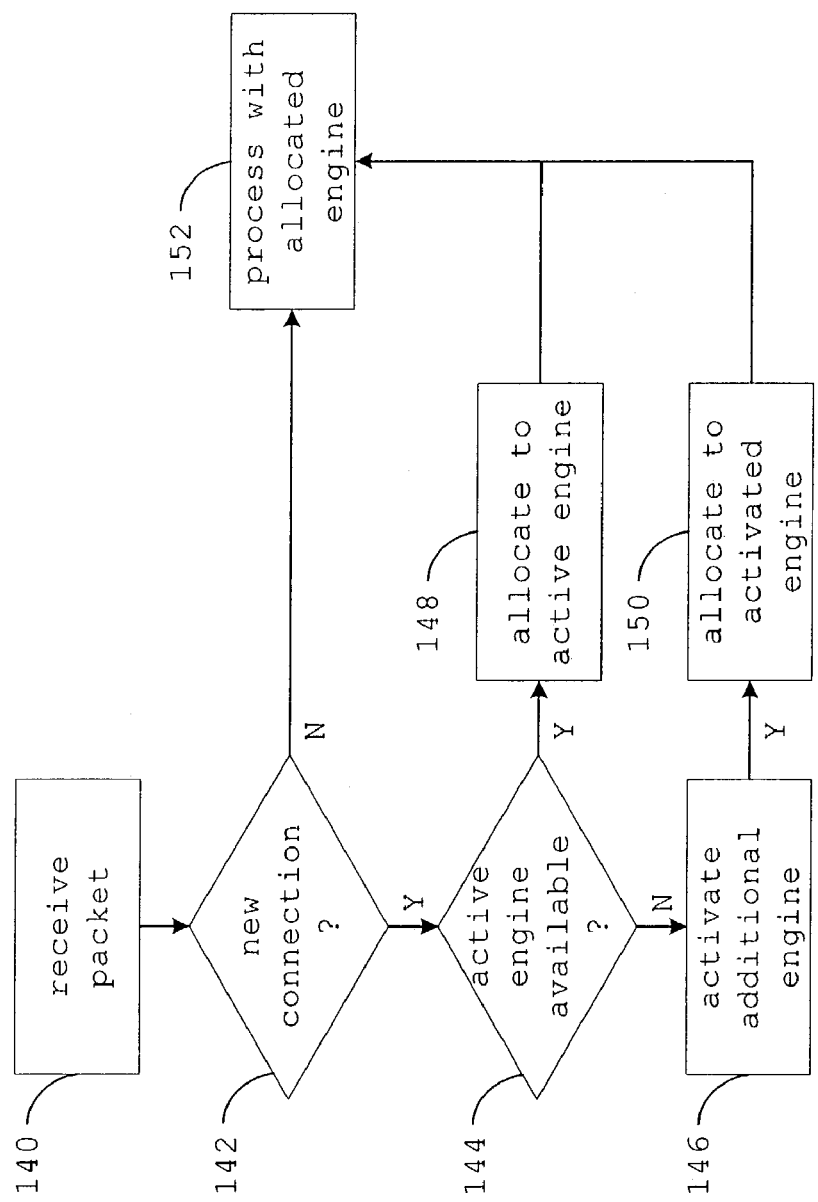
FIG. 4 is a flow-chart of a process to allocate a packet to an off-load engine.

FIG. 4 depicts a flow chart of a process for allocating connections to different off-load engines. As shown, after receiving 140 a packet, the process determines 142 whether the packet is part of a new connection or is part of one already allocated to an engine. For example, a connection may be defined as a combination of a packet's Internet Protocol (IP) source and destination addresses, transport layer protocol, and source and destination ports. An engine may lookup a packet's connection data within data identifying connections allocated to the engine. If an engine reports a "hit", the engine 152 may process the packet (e.g., perform TCP operations). Otherwise, the controller may allocate an engine for the new connection.

The allocation may be done in a variety of ways (e.g., round-robin load-balancing). However, as shown, allocation may be performed to concentrate connection allocation among engines. This can enable the controller to power-down more "empty" engines. Thus, as shown, the process can determine 144 whether an engine currently allocated to an on-going connection has the capacity to handle an additional connection. If so, the connection may be allocated 148 to the engine for processing 152. That is, the allocated engine can handle the current and future segments in the connection.

Potentially, engines currently allocated to connections may not be able support an additional connection (e.g., as identified by a "full" signal 110). Thus, the process may activate 146 an additional engine and allocate 148 the new connection to the newly activated engine for processing 152.

A process like the one illustrated in FIG. 4 may also be used by a hierarchical controller (e.g., 122 in FIG. 3), though the hierarchical controller may interact with a group (120 in FIG. 3) or the group's controller 102 rather than individual engines. For example, the hierarchical controller 122 may assert or deassert a "grant" signal to the group controllers based on signals asserted by the groups.

The controllers and engines may be implemented in a variety of ways. For example, the engines and controllers may be implemented as an Application-Specific Integrated Circuit (ASIC), programmable gate array (PGA), or other digital logic.

Figure 5:
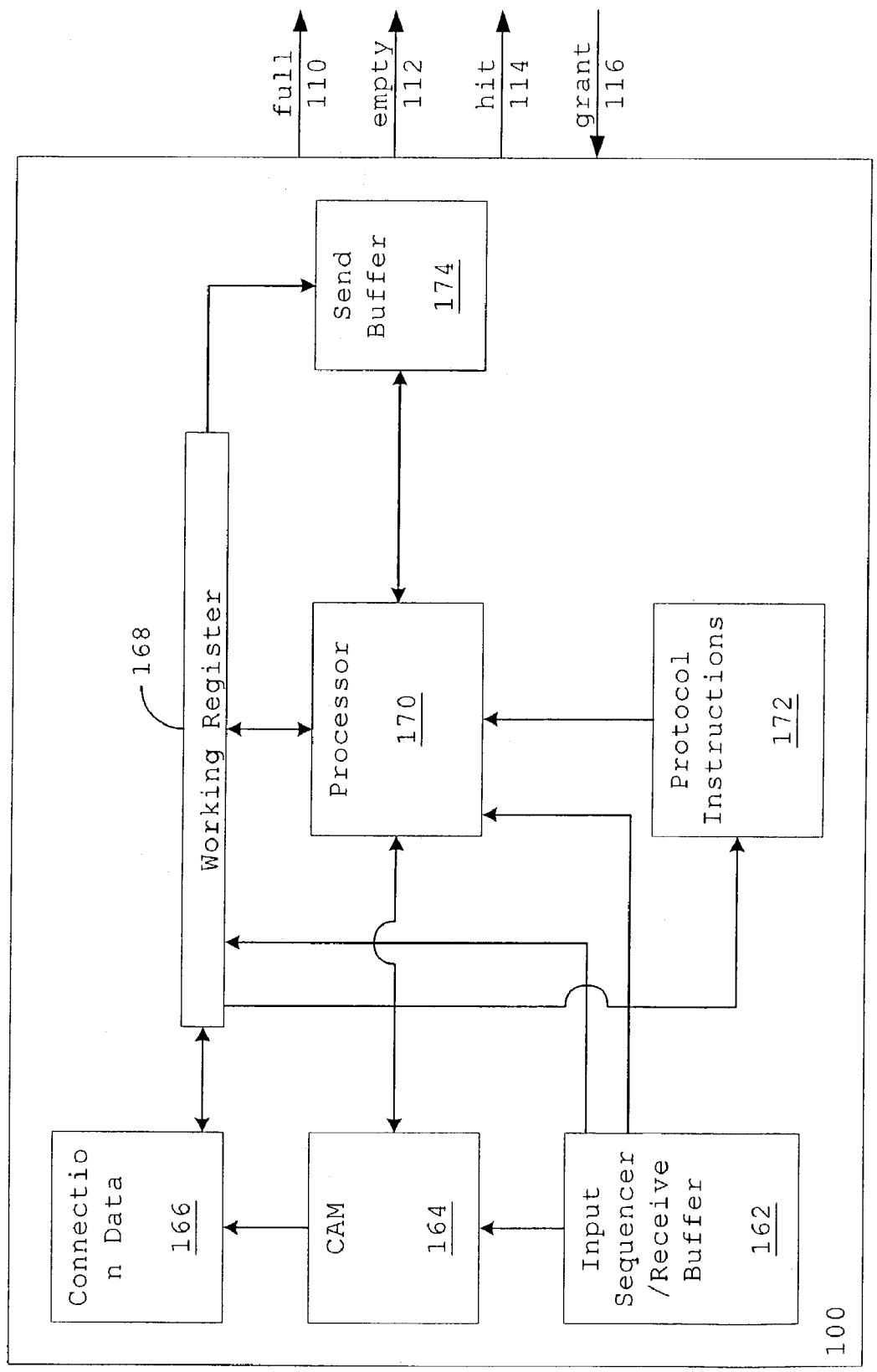
FIG. 5 is a diagram of an off-load engine.

A wide variety of engine architectures may be used. For example, the engine may be implemented by a programmed network processor, such as a processor having multiple Reduced Instruction Set Computing (RISC) processors (e.g., an Intel® Internet eXchange Processor (IXP)). Alternately, FIG. 5 depicts an example of an engine 100 that includes a processor 170 (e.g., a micro-controller, arithmetic logic unit (ALU), or micro-processor) and storage 172 (e.g., ROM (Read-Only Memory) or RAM (Random Access Memory)) for instructions that the processor 170 can execute to perform network protocol operations. The instruction-based engine 100 offers a high degree of flexibility. For example, as a network protocol undergoes changes or is replaced, the engine 100 can be updated by replacing the instructions instead of replacing the engine 100 itself.

As an overview of engine 100 operation, the engine 100 stores context data for different connections in a memory 166. For example, for the TCP protocol, this data is known as TCB (Transmission Control Block) data. For a given packet, the engine 100 looks-up the corresponding connection context in memory 166 and makes this data available to the processor 170, in this example, via a working register 168. Using the context data, the processor 170 executes an appropriate set of protocol implementation instructions 172. Context data, potentially modified by the processor 170, is then returned to the context memory 166.

In greater detail, the engine 100 shown includes an input sequencer/buffer 162 that parses a received packet's header(s) (e.g., the TCP and IP headers of a TCP/IP packet) and temporarily buffers the parsed data. The input sequencer/buffer 162 may also initiate storage of the packet's payload in host accessible memory (e.g., via Direct Memory Access (DMA)).

As described above, the engine 100 stores context data 166 for different network connections. To quickly retrieve context data from memory 166 for a given packet, the engine 100 depicted includes a content-addressable memory 164 (CAM) that stores different connection identifiers (e.g., index numbers) for different connections as identified, for example, by a combination of a packet's IP source and destination addresses and source and destination ports. A CAM can quickly retrieve stored data based on content values much in the way a database can retrieve records based on a key. Thus, based on the packet data parsed by the input sequencer 162, the CAM 164 can quickly retrieve a connection identifier and feed this identifier to the context data memory 166. In turn, the connection context data corresponding to the identifier is transferred from the memory 166 to the working register 168 for use by the processor 170.

When an engine is allocated a new connection by the controller, the current packet may represent the start of a new connection. Thus, the engine 100 can initialize the working register 168 (e.g., set to the "LISTEN" state in TCP) and allocate CAM 164 and context data 166 entries for the connection, for example, using a LRU (Least Recently Used) algorithm or other allocation scheme.

The number of data lines connecting different components of the engine 100 may be chosen to permit data transfer between connected components in a single clock cycle. For example, if the context data for a connection includes x-bits of data, the engine 100 may be designed such that the connection data memory 166 may offer x-lines of data to the working register 168.

The sample implementation shown may use, at most, three processing cycles to load the working register 168 with connection data: one cycle to query the CAM 164; one cycle to access the connection data 166; and one cycle to load the working register 168. This design can both conserve processing time and economize on power-consuming access to the memory structures 164, 166.

After retrieval of connection data for a packet, the engine 100 processor 170 can execute protocol implementation instructions stored in memory 172. After receiving a "wake" signal (e.g., from the input sequencer 162 when the connection context is retrieved or being retrieved), the processor 170 may determine the state of the current connection and identify the starting address of instructions for handling this state. The processor 170 then executes the instructions beginning at the starting address. Depending on the instructions, the processor 170 can alter context data (e.g., by altering working register 168), assemble a message (e.g., a TCP ACK) in a send buffer 174 for subsequent network transmission, and/or may make processed packet data available to the host(s) via bus 104. Again, context data, potentially modified by the processor 170, is returned to the context data memory 166.

As shown, the engine 100 receives a grant 116 signal from a controller. The grant 116 signal may be used to control operation of the processor 170. For example, to save power, the grant 116 signal received from a controller may feed an AND gate also fed by the processor clock. Thus, when the grant 116 signal is not asserted, the processor does not receive a clock signal.

As shown, in addition to receiving the grant 116 signal from a controller, the engine 100 also generates a "hit" 114 signal when the engine 100 has been allocated for the current packet's connection (e.g., when the connection is found within CAM 164). The engine 100 may also generate "full" 110 and "empty" 112 signals based on available capacity of the CAM 164 and/or connection memory 166.

Figure 6:
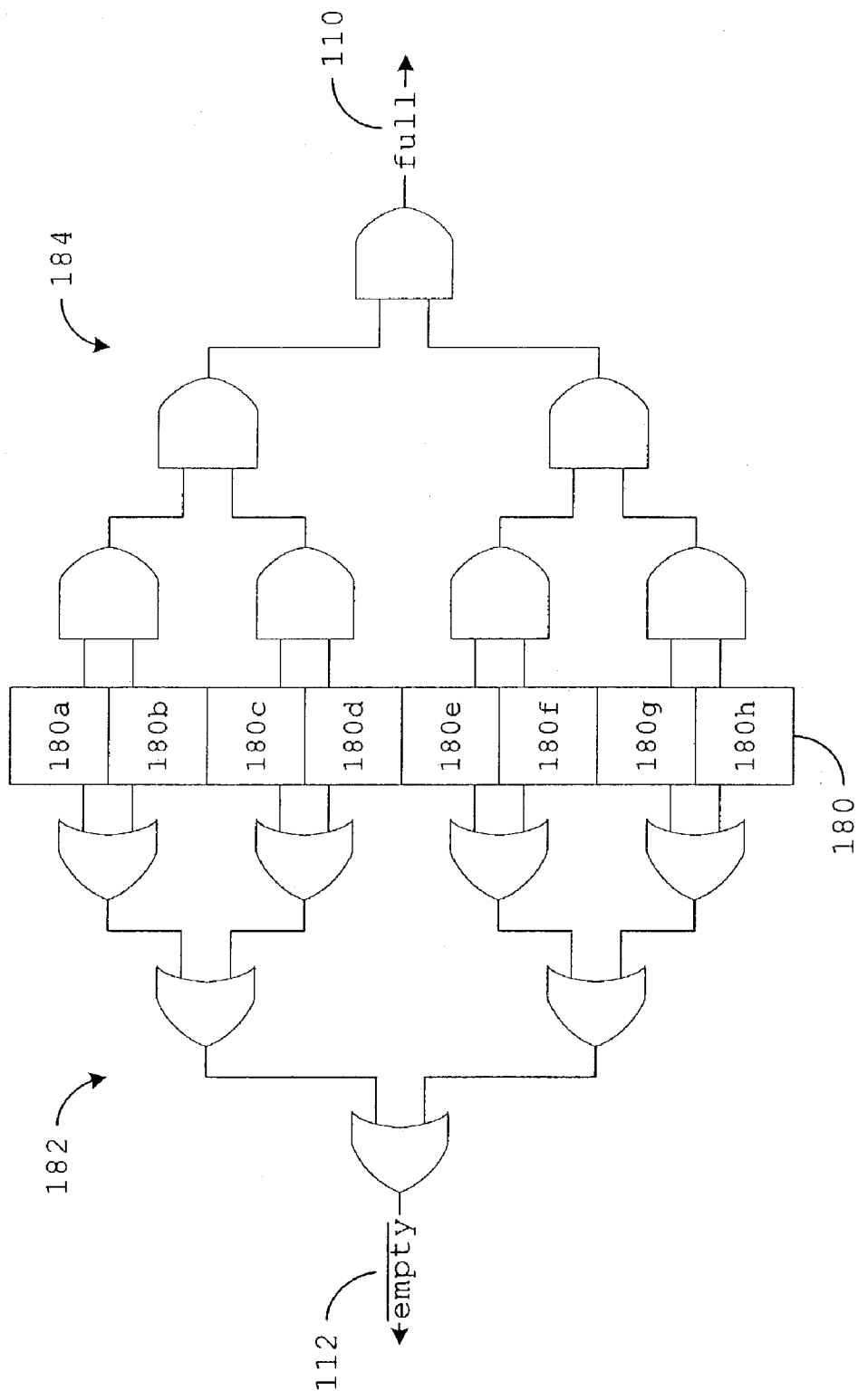
FIG. 6 is a diagram of logic to generate signals corresponding to current off-load engine usage.

The signals described above may be generated in a wide variety of ways. For example, FIG. 6 illustrates an example of logic that can generate "full" 110 and "empty" 112 signals. The logic operates on a register 180 maintained by the CAM 164. Though the register 180 is shown as having 8-bits, a register 180 will typically have more (e.g., 128). A "1"-bit (e.g., register bit 180b) identifies a used CAM 164 entry while a "0"-bit (e.g., register bit 180a) identifies an unused CAM 164 entry. The logic shown includes a network 184 of AND gates that generates a "full" 110 signal when all register bits are set to "1". The logic shown also includes a network 182 of OR gates that generates an "empty" signal 112. Again, the signals and logic shown are merely illustrative. For example, instead of the logic gates shown, the register 180 may feed an encoder that translates the register 180 bit values into a value identifying usage.

In a system aggregating a collection of the sample engine illustrated in FIG. 5, engine 100 CAMs are initially "empty" and no engine receives a "grant" signal. After receiving a packet forming part of a connection, the controller 102 selects an engine 100 for allocation of the connection and asserts the grant signal 116 to the selected engine 100. The selected engine 100 processes the incoming segment and updates its CAM 164 and TCB 166 contents. The grant 116 also enables the engine 100 to drive data on the bus 104 for the duration of the segment.

The controller 102 can allocate further connections to the engine 100 until the engine 100 signals "full" 110. The "full" signal 110 causes the controller 102 to allocate new connections to a different engine (though potentially an already active engine).

A newly arriving segment could be either an existing connection allocated to one of the active engines or an unallocated (e.g., new) connection. To determine whether an engine 100 has already been allocated for the packet's connection, the controller 102 asserts the grant signal to engines 100 currently servicing at least one on-going connection. These engines 100 perform a connection (e.g., CAM 164) lookup in parallel. For a new connection (e.g., no engine reports a CAM 164 hit), the controller 102 allocates the connection to the most recently activated engine 100, provided it is not signaling "full" 110. If a "full" signal 110 is asserted by the engine 100, however, the controller then picks the next most recently activated engine, for example, by accessing a queue identifying engines most recently allocated their first connection. This process may continue until an active engine 100 is identified that is not asserting a "full" signal 110. If no such active engine 100 is identified, the controller 102 may activate another engine 100 and allocate the connection to it.

The engine 100 allocated to the current connection completes TCP processing for the duration of the segment, while other active engines are temporarily idle, meaning their grants 116 are temporarily de-asserted. Existing grants 116 are re-asserted after the allocated engine completes its network protocol operations on the packet. If an engine 100 no longer is allocated to an active connection, the controller can de-assert a grant signal until the engine 100 is again activated.

FIGS. 7-18 describe features of the off-load engine 100 depicted in FIG. 5 in greater detail. Again, other off-load engines may or may not provide these features and may feature different implementations.

Figure 7:
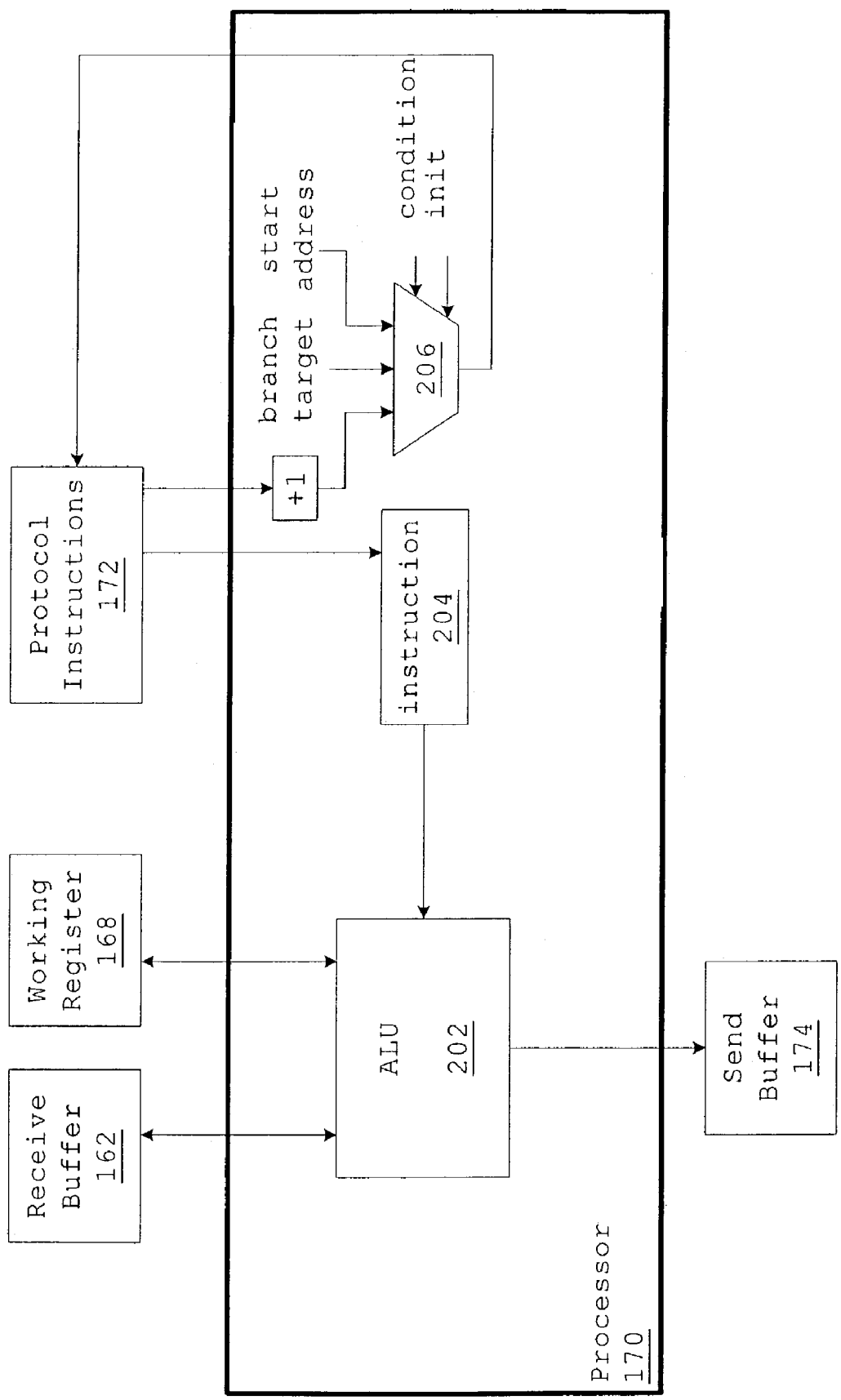
FIG. 7 is a schematic of a processor of an off-load engine.

FIG. 7 depicts an engine 100 processor 170 in greater detail. As shown, the processor 170 may include an ALU (arithmetic logic unit) 202 that decodes and executes micro-code instructions loaded into an instruction register 204. The instructions 172 may be loaded 206 into the instruction register 204 from memory 172 in sequential succession with exceptions for branching instructions and start address initialization. The instructions 172 may specify access (e.g., read or write access) to the receive buffer 162 that stores the parsed packet data, the working register 168, the send buffer 174, and/or host memory (not shown). The instructions may also specify access to scratch memory, miscellaneous registers (e.g., registers dubbed R0, cond, and statusok), shift registers, and so forth (not shown). For programming convenience, the different fields of the send buffer 174 and working register 168 may be assigned labels for use in the instructions. Additionally, various constants may be defined, for example, for different connection states. For example, "LOAD TCB[state], LISTEN" instructs the processor 170 to change the state of the connection context state in the working register 168 to the "LISTEN" state.

FIG. 8 depicts an example of a micro-code instruction set that can be used to program the processor to perform protocol operations. As shown, the instruction set includes operations that move data within the system (e.g., LOAD and MOV), perform mathematic and Boolean operations (e.g., AND, OR, NOT, ADD, SUB), compare data (e.g., CMP and EQUAL), manipulate data (e.g., SHL (shift left)), and provide branching within a program (e.g., BREQZ (conditionally branch if the result of previous operation equals zero), BRNEQZ (conditionally branch if result of previous operation does not equal zero), and JMP (unconditionally jump)).

The instruction set also includes operations specifically tailored for use in implementing protocol operations with engine 100 resources. These instructions include operations for clearing the CAM 164 of an entry for a connection (e.g., CAM1CLR) and for saving context data to the context data storage 166 (e.g., TCBWR). Other implementations may also include instructions that read and write connection data to the CAM 164 (e.g., CAM1READ key-->data and CAM1WRITE key-->data) and an instruction that reads the context data 166 (e.g., TCBRD index-->destination). Alternately, these instructions may be implemented as hard-wired logic.

Though potentially lacking many instructions offered by traditional general purpose CPUs (e.g., processor 170 may not feature instructions for floating-point operations), the instruction set provides developers with easy access to engine 100 resources tailored for network protocol implementation. A programmer may directly program protocol operations using the micro-code instructions. Alternately, the programmer may use a wide variety of code development tools (e.g., a compiler or assembler).

As described above, the engine 100 instructions can implement operations for a wide variety of network protocols. For example, the engine may implement operations for a transport layer protocol such as TCP. A complete specification of TCP and optional extensions can be found in RFCs (Request for Comments) 793, 1122, and 1323.

Briefly, TCP provides connection-oriented services to applications. That is, much like picking up a telephone and assuming the phone company will make everything in-between work, TCP provides applications with simple primitives for establishing a connection (e.g., CONNECT and CLOSE) and transferring data (e.g., SEND and RECEIVE). TCP transparently handles communication issues such as data retransmission, congestion, and flow control.

To provide these services to applications, TCP operates on packets known as segments. A TCP segment includes a TCP header followed by one or more data bytes. A receiver can reassemble the data from received segments. Segments may not arrive at their destination in their proper order, if at all. For example, different segments may travel very different paths across a network. Thus, TCP assigns a sequence number to each data byte transmitted. Since every byte is sequenced, each byte can be acknowledged to confirm successful transmission. The acknowledgment mechanism is cumulative so that an acknowledgment of a particular sequence number indicates that bytes up to that sequence number have been successfully delivered.

The sequencing scheme provides TCP with a powerful tool for managing connections. For example, TCP can determine when a sender should retransmit a segment using a technique known as a "sliding window". In the "sliding window" scheme, a sender starts a timer after transmitting a segment. Upon receipt, the receiver sends back an acknowledgment segment having an acknowledgement number equal to the next sequence number the receiver expects to receive. If the sender's timer expires before the acknowledgment of the transmitted bytes arrives, the sender transmits the segment again. The sequencing scheme also enables senders and receivers to dynamically negotiate a window size that regulates the amount of data sent to the receiver based on network performance and the capabilities of the sender and receiver.

In addition to sequencing information, a TCP header includes a collection of flags that enable a sender and receiver to control a connection. These flags include a SYN (synchronize) bit, an ACK (acknowledgement) bit, a FIN (finish) bit, a RST (reset) bit. A message including a SYN bit of "1" and an ACK bit of "0" (a SYN message) represents a request for a connection. A reply message including a SYN bit "1" and an ACK bit of "1" (a SYN+ACK message) represents acceptance of the request. A message including a FIN bit of "1" indicates that the sender seeks to release the connection. Finally, a message with a RST bit of "1" identifies a connection that should be terminated due to problems (e.g., an invalid segment or connection request rejection).

Figure 9:
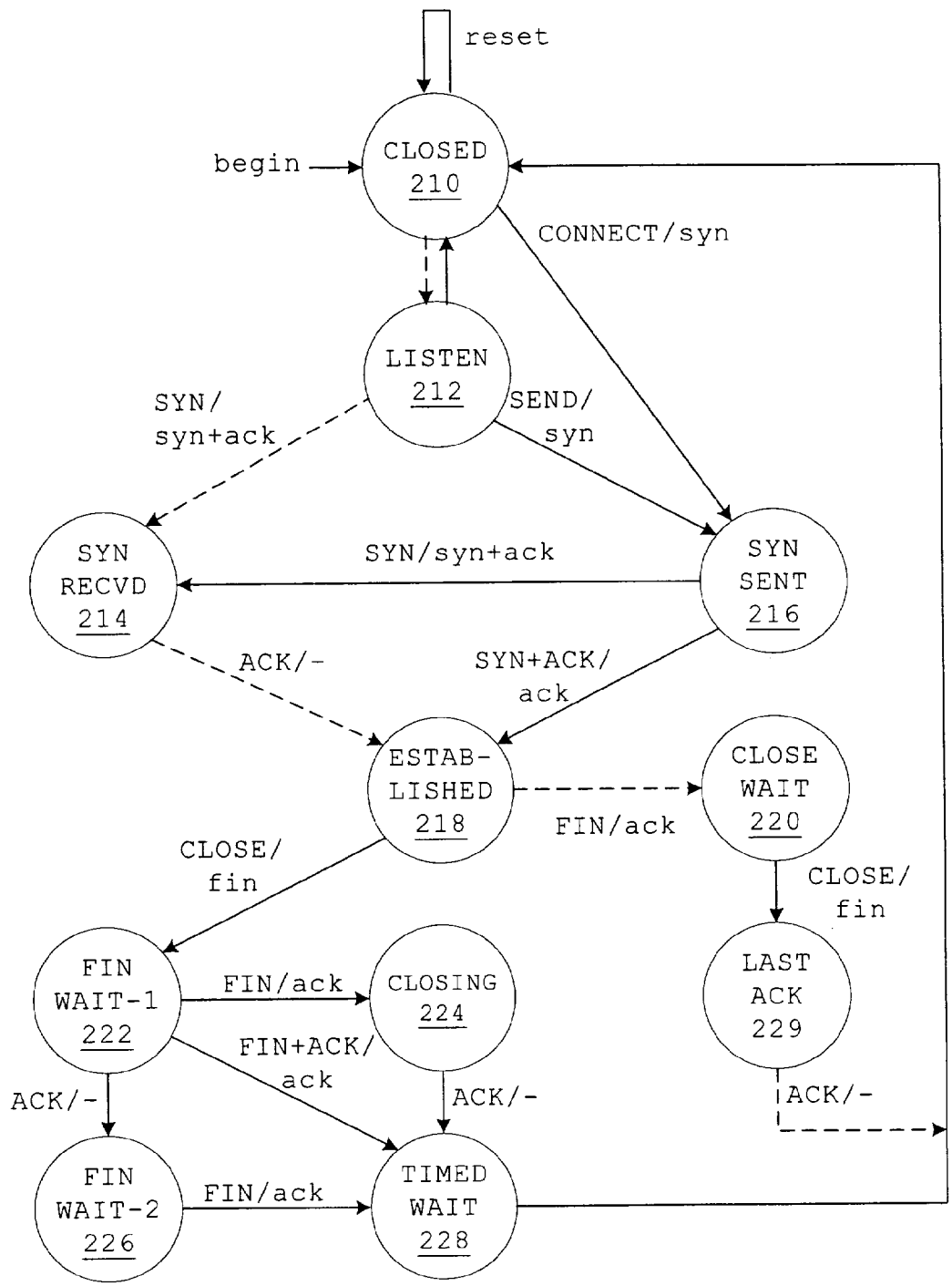
FIG. 9 is a diagram of a TCP (Transmission Control Protocol) state machine.

FIG. 9 depicts a state diagram representing different stages in the establishment and release of a TCP connection. The diagram depicts different states 210-229 and transitions (depicted as arrowed lines) between the states 210-229. The transitions are labeled with corresponding event/action designations that identify an event and an action required to move to a subsequent state 210-229. For example, a connection moves from the LISTEN state 212 to the SYN RCVD state 214 after receiving a SYN message and responding with a SYN+ACK message, In the state diagram of FIG. 9, the typical path for a sender (a TCP entity requesting a connection) is shown with solid transitions while the typical paths for a receiver is shown with dotted line transitions. To illustrate operation of the state machine, a receiver typically begins in the CLOSED state 210 that indicates no connection is currently active or pending. After moving to the LISTEN 212 state to await a connection request, the receiver will receive a SYN message requesting a connection and will acknowledge the SYN message with a SYN+ACK message and enter the SYN RCVD state 214. After receiving acknowledgement of the SYN+ACK message, the connection enters an ESTABLISHED state 218 that corresponds to normal on-going data transfer. The ESTABLISHED state 218 may continue for some time. Eventually, assuming no reset message arrives and no errors occur, the server will receive and acknowledge a FIN message and enter the CLOSE WAIT state 220. After issuing its own FIN and entering the LAST ACK state 229, the server will receive acknowledgment of its FIN and finally return to the original CLOSED 210 state.

Again, the state diagram also manages the state of a TCP sender. The sender and receiver paths share many of the same states described above. However, the sender may also enter a SYN SENT state 216 after requesting a connection, a FIN WAIT 1 state 222 after requesting release of a connection, a FIN WAIT 2 state 226 after receiving an agreement from the receiver to release a connection, a CLOSING state 224 where both sender and receiver request release simultaneously, and a TIMED WAIT state 228 where previously transmitted connection segments expire.

The engine's 100 protocol instructions may implement many, if not all, of the TCP operations described above and in the RFCs. For example, the instructions may include procedures for option processing, window management, flow control, congestion control, ACK message generation and validation, data segmentation, special flag processing (e.g., setting and reading URGENT and PUSH flags), checksum computation, and so forth. The protocol instructions may also include other operations related to TCP such as security support, random number generation, RDMA (Remote Direct Memory Access) over TCP, and so forth.

In an engine 100 configured to provide TCP operations, the context data may include 264-bits of information per connection including: 32-bits each for PUSH (identified by the micro-code label "TCB[pushseq]"), FIN ("TCB[finseq]"), and URGENT ("TCB[rupseq]") sequence numbers, a next expected segment number ("TCB[rnext]"), a sequence number for the currently advertised window ("TCB[cwin]"), a sequence number of the last unacknowledged sequence number ("TCB[suna]"), and a sequence number for the next segment to be next ("TCB[snext]"). The remaining bits store various TCB state flags ("TCB[flags]"), TCP segment code ("TCB[code]"), state ("TCB[tcbstate]"), and error flags ("TCB[error]"), To illustrate programming for an engine 100 configured to perform TCP operations, Appendix A features an example of source micro-code for a TCP receiver. Briefly, the routine TCPRST checks the TCP ACK bit, initializes the send buffer, and initializes the send message ACK number. The routine TCPACKIN processes incoming ACK messages and checks if the ACK is invalid or a duplicate. TCPACKOUT generates ACK messages in response to an incoming message based on received and expected sequence numbers. TCPSEQ determines the first and last sequence number of incoming data, computes the size of incoming data, and checks if the incoming sequence number is valid and lies within a receiving window. TCPINITCB initializes TCB fields in the working register. TCPINITWIN initializes the working register with window information. TCPSENDWIN computes the window length for inclusion in a send message. Finally, TCBDATAPROC checks incoming flags, processes "urgent", "push" and "finish" flags, sets flags in response messages, and forwards data to an application or user Another operation performed by the engine 100 may be packet reordering. For example, like many network protocols, TCP does not assume TCP packets ("segments") will arrive in order. To correctly reassemble packets, a receiver can keep track of the last sequence number received and await reception of the byte assigned the next sequence number. Packets arriving out-of-order can be buffered until the intervening bytes arrive. Once the awaited bytes arrive, the next bytes in the sequence can potentially be retrieved quickly from the buffered data.

FIGS. 10-14 illustrate operation of a scheme to track out-of-order packets that can be implemented by the engine 100. The scheme permits quick "on-the-fly" ordering of packets without employing a traditional sorting algorithm. The scheme may be implemented using another set of content-addressable memory 240, 242, though this is not a requirement. An engine 100 using this technique may include two different sets of content-addressable memory—the content-addressable memory 164 used to retrieve connection context data and the content-addressable memory used to track out-of-order packets.

For the purposes of illustration, FIGS. 10-14 are discussed in the context of an implementation of TCP. However, the scheme has wide applicability to a variety of packet re-ordering schemes such as numbered packets (e.g., protocol data unit fragments). Thus, while the description below discusses storage of TCP sequence numbers, an embodiment for numbered packets can, instead, store packet numbers.

Briefly, when a packet arrives, a packet tracking sub-system determines whether the received packet is in-order. If not, the sub-system consults memory to identify a contiguous set of previously received out-of-order packets bordering the newly arrived packet and can modify the data stored in the memory to add the packet to the set. When a packet arrives in-order, the sub-system can access the memory to quickly identify a contiguous chain of previously received packets that follow the newly received packet.

Figure 10:
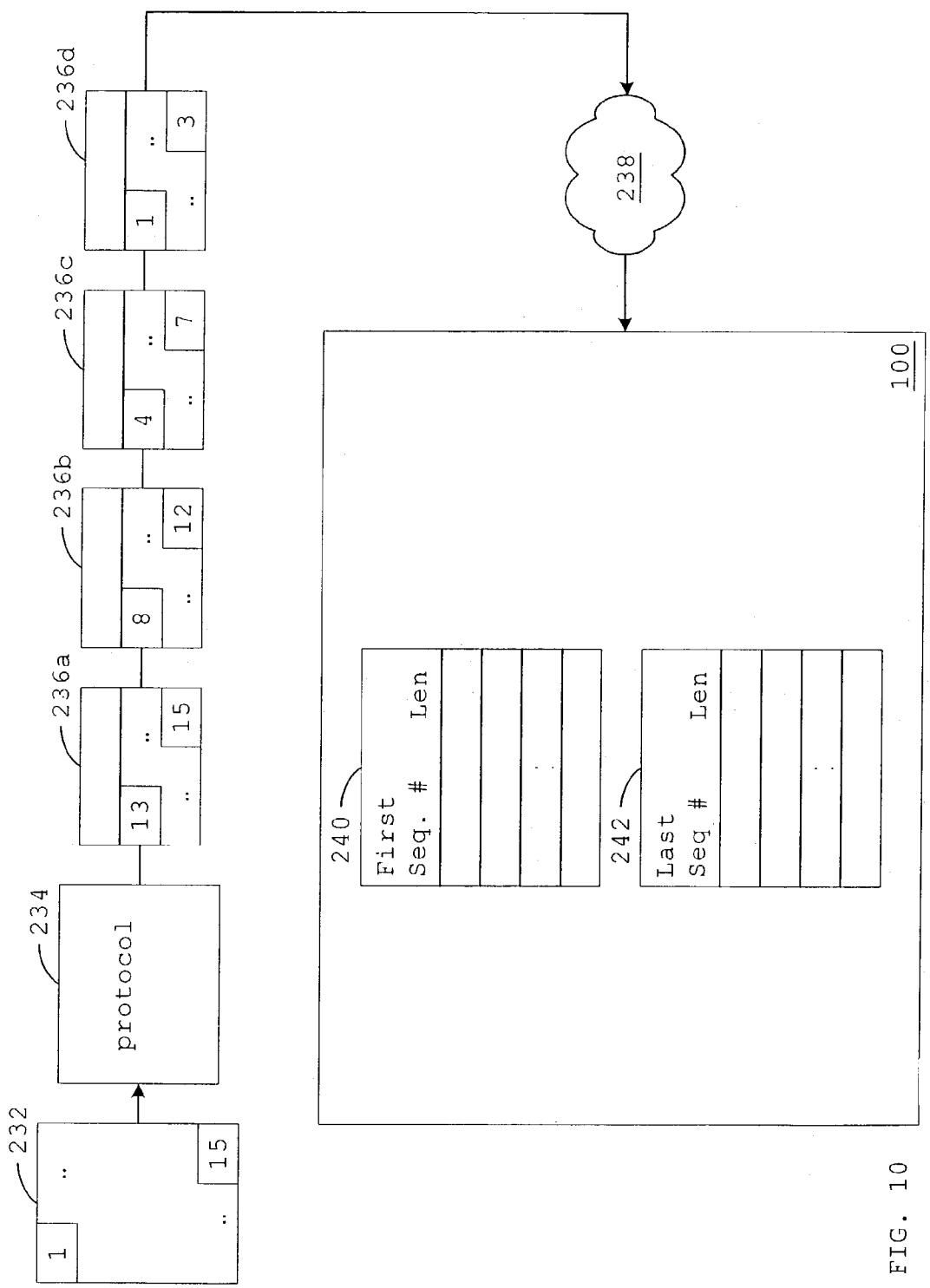
FIGS. 10-14 illustrate operation of a scheme to track out-of-order packets.

In greater detail, as shown in FIG. 10, a protocol 234 (e.g., TCP) divides a set of data 232 into a collection of packets 236a-236d for transmission over a network 238. In the example shown, 15-bytes of an original set of data 232 are distributed across packets 236a-236d. For example, packet 236d includes bytes assigned sequence numbers "1" to "3".

As shown, the engine 100 includes content-addressable memory 240, 242 that stores information about received, out-of-order packets. Memory 240 stores the first sequence number of a contiguous chain of one or more out-of-order packets and the length of the chain. Thus, when a new packet arrives that ends where the pre-existing chain begins, the new packet can be added to the top of the pre-existing chain. Similarly, the memory 242 also stores the end (the last sequence number+1) of a contiguous packet chain of one or more packets and the length of the chain. Thus, when a new packet arrives that begins at the end of a previously existing chain, the new packet can be appended to form an even larger chain of contiguous packets. To illustrate these operations, FIGS. 11-14 depict a sample series of operations that occur as the packets 236a-236d arrive.

Figure 11:
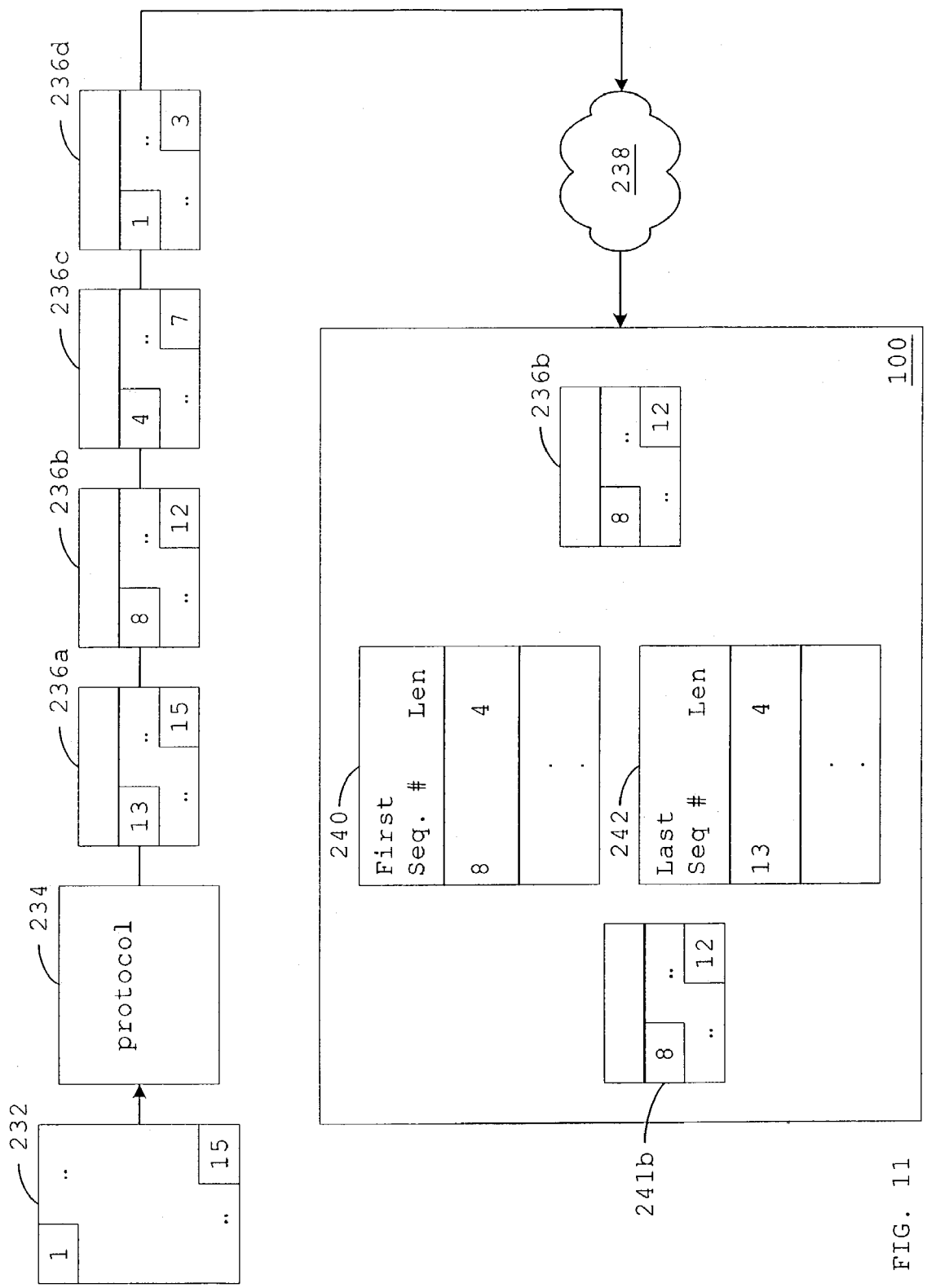

As shown in FIG. 11, packet 236b arrives carrying bytes with sequence numbers "8" through "12". Assuming the engine 100 currently awaits sequence number "1", packet 236b has arrived out-of-order. Thus, as shown, the engine 100 tracks the out-of-order packet 236b by modifying data stored in its content-addressable memory 240, 242. The packet 236b does not border a previously received packet chain as no chain yet exists in this example. Thus, the engine 100 stores the starting sequence number, "8", and the number of bytes in the packet, "4". The engine also stores identification of the end of the packet. In the example shown, the engine stores the ending boundary by adding one to the last sequence number of the received packet (e.g., 12+1=13). In addition to modifying or adding entries in the content-addressable memory 240, 242, the engine 100 can store the packet or a reference (e.g., a pointer) to the packet 241b to reflect the relative order of the packet. This permits fast retrieval of the packets when finally sent to an application.

Figure 12:
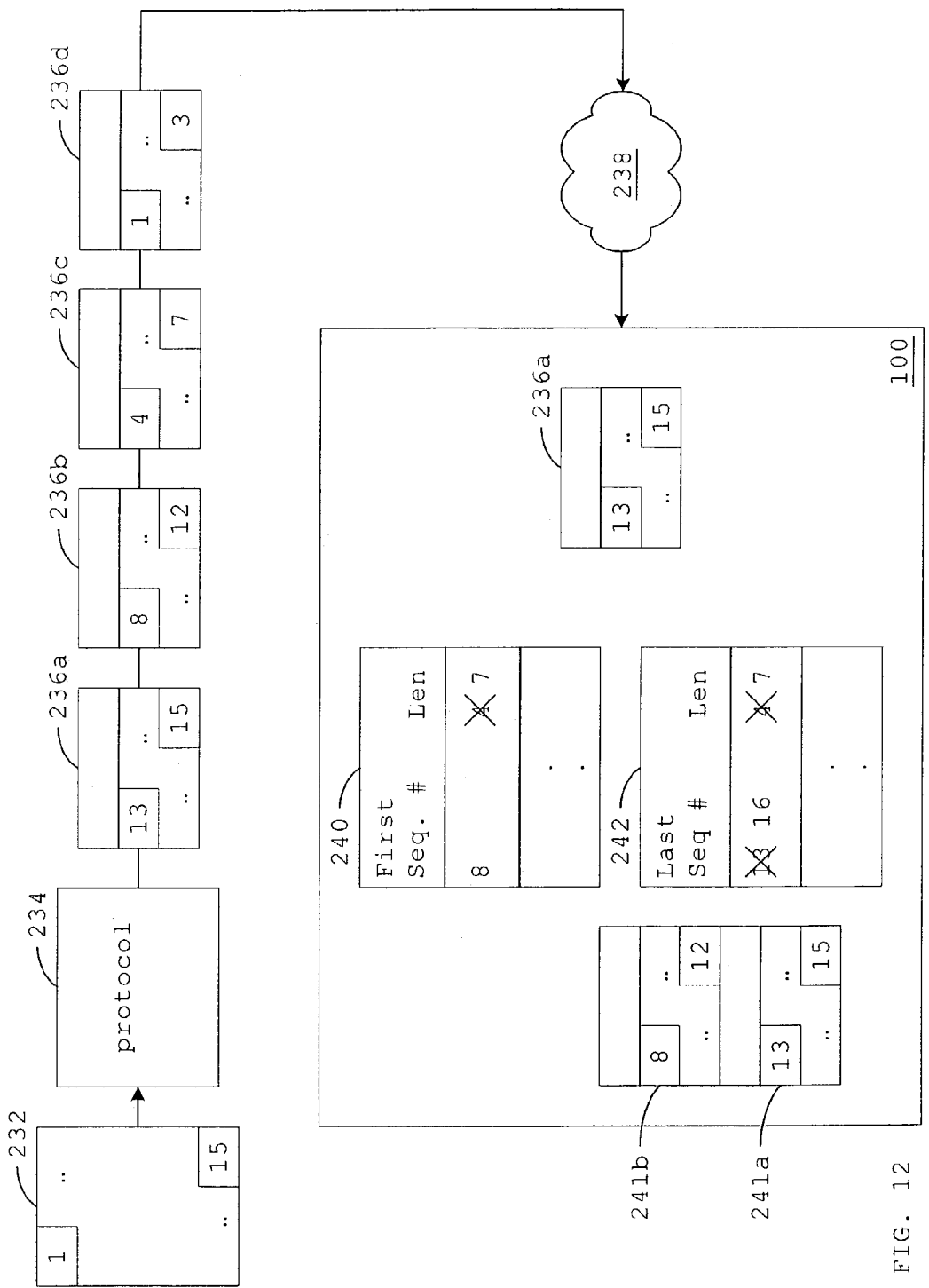

As shown in FIG. 12, the engine 100 next receives packet 236a carrying bytes "13" through "15". Again, the engine 100 still awaits sequence number "1". Thus, packet 236a has also arrived out-of-order. The engine 100 examines memory 240, 242 to determine whether the received packet 236a borders any previously stored packet chains. In this case, the newly arrived packet 236a does not end where a previous chain begins, but does begin where a previous chain ends. In other words, packet 236a borders the "bottom" of packet 236b. As shown, the engine 100 can merge the packet 236a into the pre-existing chain in the content-addressable memory data by increasing the length of the pre-existing chain and modifying its first and last sequence number data accordingly. Thus, the first sequence number of the new chain remains "8" though the length is increased from "4" to "7", while the end sequence number of the chain is increased from "13" to "16" to reflect the bytes of the newly received packet 236a. The engine 100 also stores the new packet 241a or a reference to the new packet to reflect the relative ordering of the packets.

Figure 13:
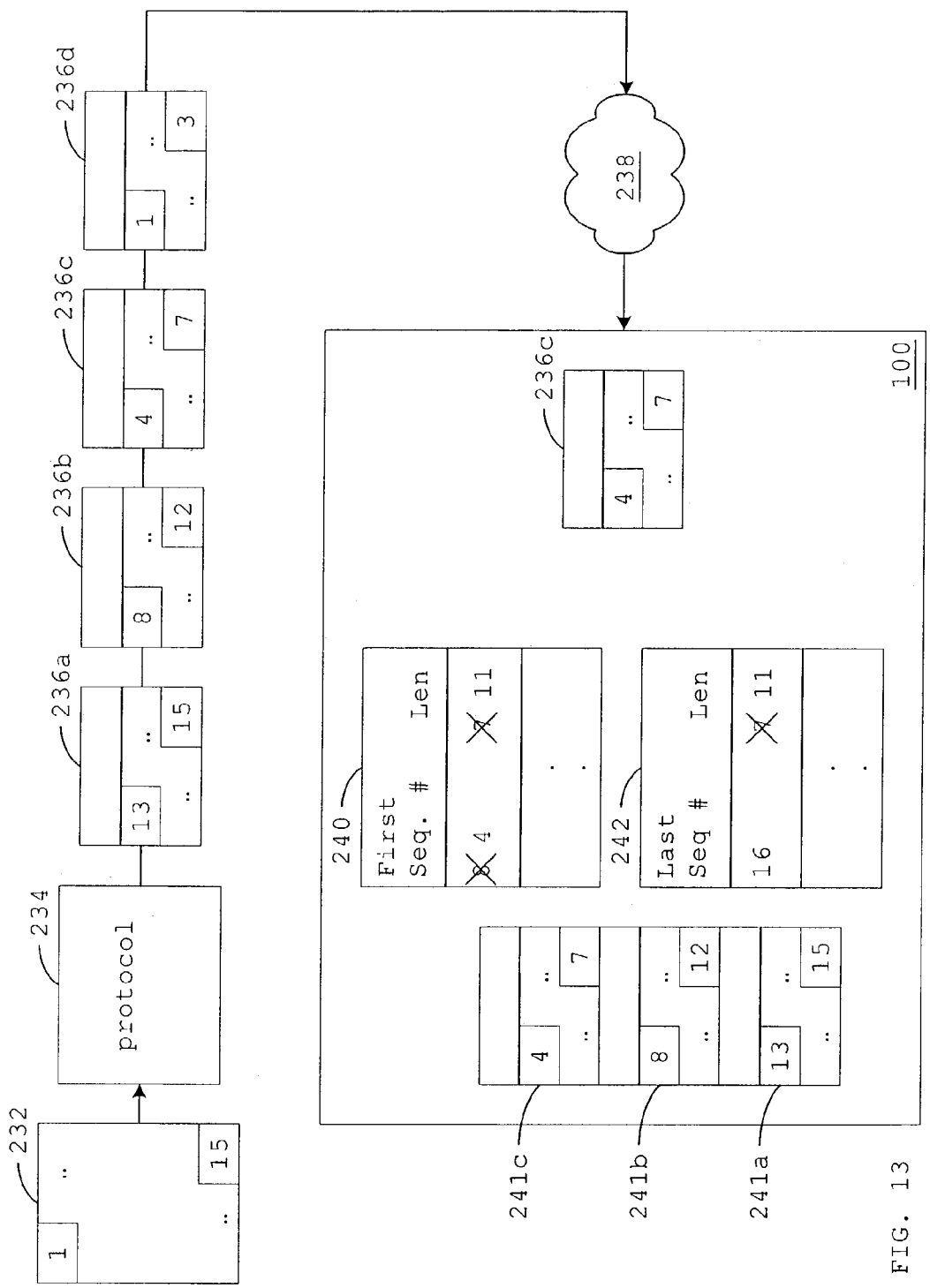

As shown in FIG. 13, the engine 100 next receives packet 236c carrying bytes "4" to "7". Since this packet 236c does not include the next expected sequence number, "1", the engine 100 repeats the process outlined above. That is, the engine 100 determines that the newly received packet 236c fits "atop" the packet chain spanning packets 236b, 236a. Thus, the engine 100 modifies the data stored in the content-addressable memory 240, 242 to include a new starting sequence number for the chain, "4", and a new length data for the chain, "11". The engine 100 again stores a reference to the packet 241c data to reflect the packet's 241c relative ordering.

Figure 14:
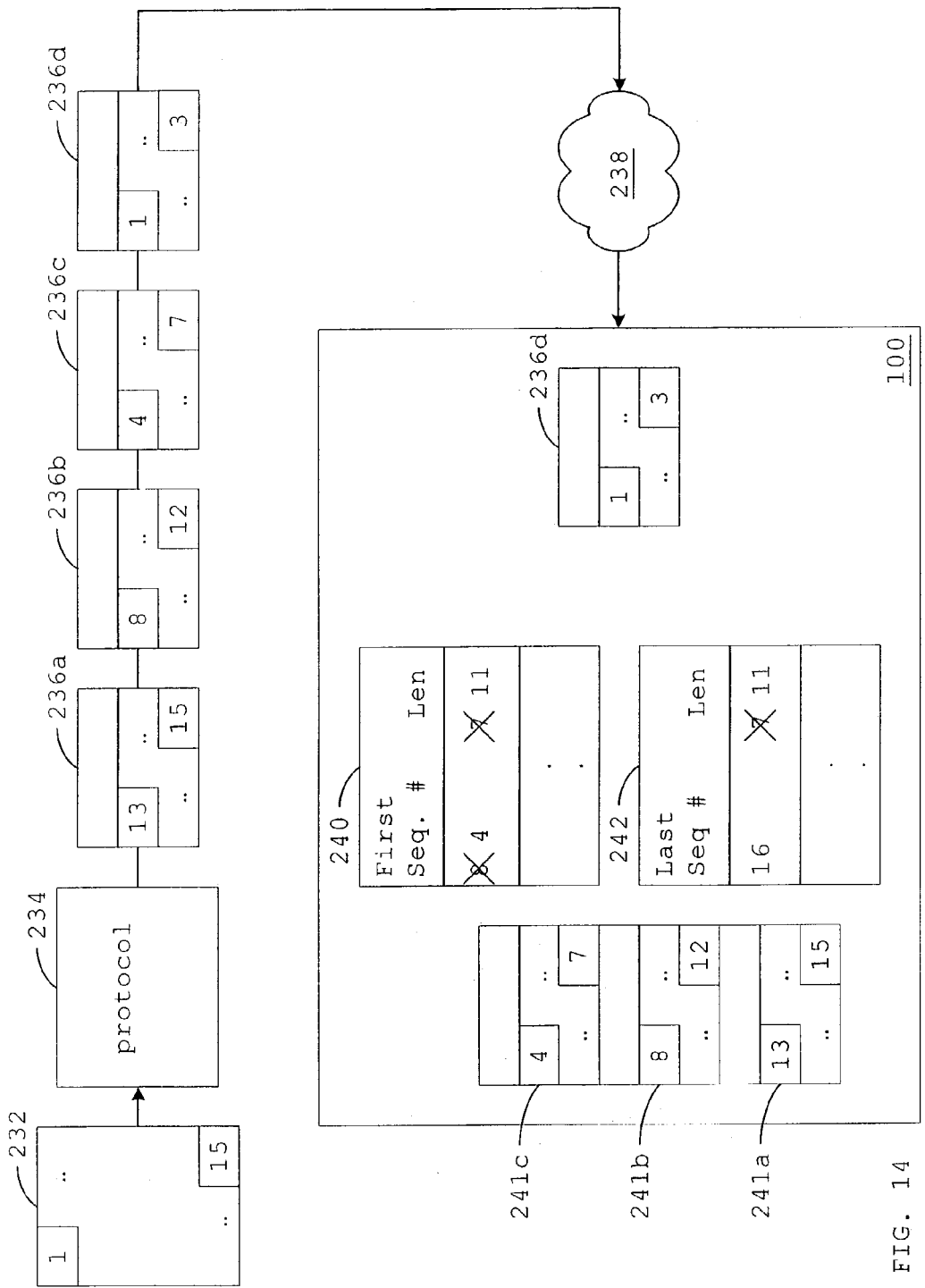

As shown in FIG. 14, the engine finally receives packet 236d that includes the next expected sequence number, "1". The engine 100 can immediately transfer this packet 236d to an application. The engine 100 can also examine its content-addressable memory 240 to see if other packets can also be sent to the application. In this case, the received packet 236d borders a packet chain that already spans packets 236a-236c. Thus, the engine 100 can immediately forward the data of chained packets to the application in the correct order.

The sample series shown in FIGS. 11-14 highlights several aspects of the scheme. First, the scheme may prevent out-of-order packets from being dropped and being retransmitted by the sender. This can improve overall throughput The scheme also uses very few content-addressable memory operations to handle out-of-order packets, saving both time and power. Further, when a packet arrives in the correct order, a single content-addressable memory operation can identify a series of contiguous packets that can also be sent to the application.

Figure 15:
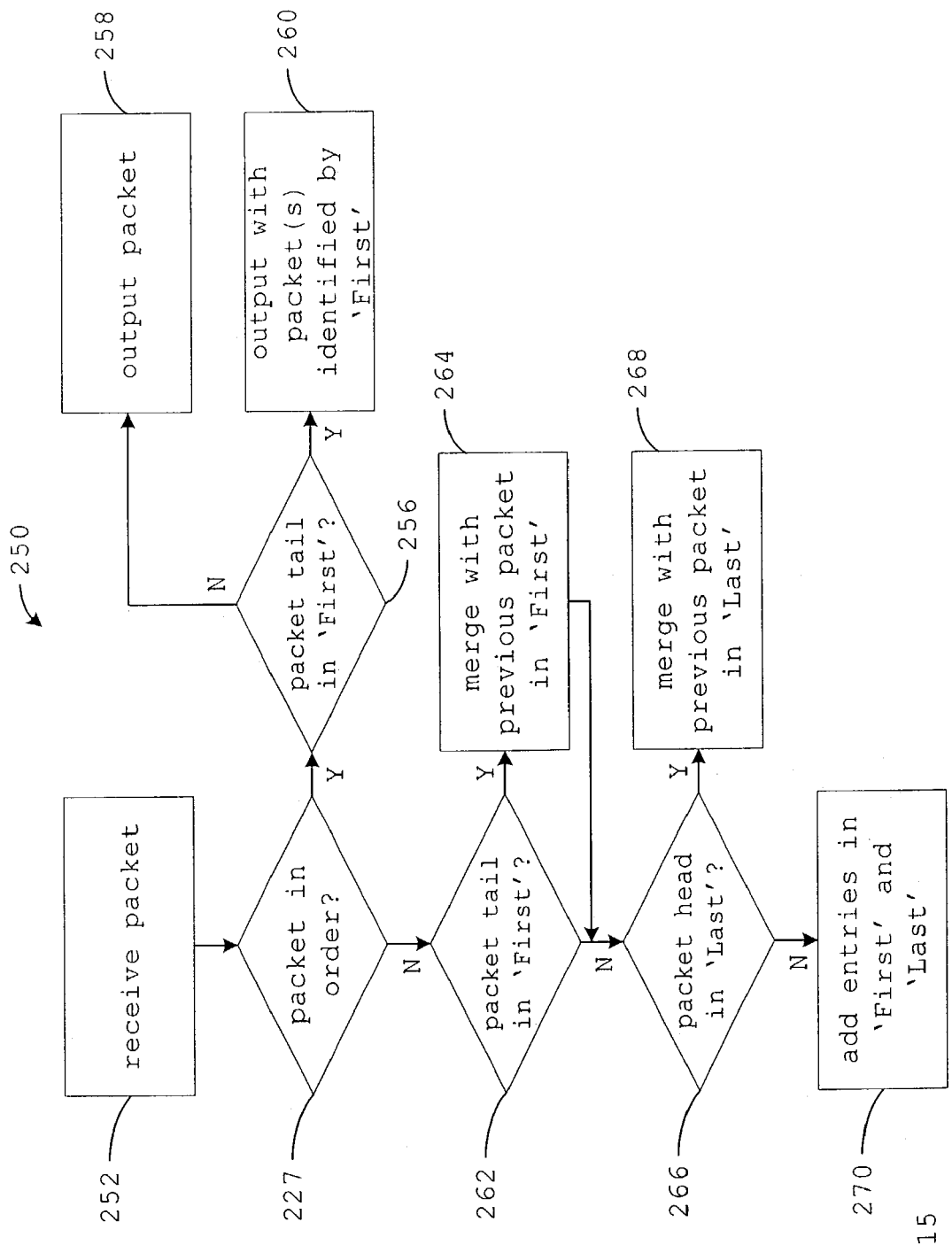
FIG. 15 is a flowchart of a process to track out-of-order packets.

FIG. 15 depicts a flowchart of a process 250 for implementing the scheme illustrated above. As shown, after receiving 252 a packet, the process 250 determines 254 if the packet is in-order (e.g., whether the packet includes the next expected sequence number). If not, the process 250 determines 262 whether the end of the received packet borders the start of an existing packet chain. If so, the process 250 can modify 264 the data stored in content-addressable memory to reflect the larger, merged packet chain starting at the received packet and ending at the end of the previously existing packet chain. The process 250 also determines 266 whether the start of the received packet borders the end of an existing packet chain. If so, the process 250 can modify 568 the data stored in content-addressable memory to reflect the larger, merged packet chain ending with the received packet.

Potentially, the received packet may border pre-existing packet chains on both sides. In other words, the newly received packet fills a hole between two non-overlapping chains. Since the process 250 checks both starting 262 and ending 266 borders of the received packet, a newly received packet may cause the process 250 to join two different chains together into a single monolithic chain.

As shown, if the received packet does not border a packet chain, the process 250 stores 270 data in content-addressable memory for a new packet chain that, at least initially, includes only the received packet.

If the received packet is in-order, the process 250 can query 256 the content-addressable memory to identify a bordering packet chain following the received packet. If such a chain exists, the process 250 can output the newly received packet to an application along with the data of other packets in the adjoining packet chain.

Figure 16:
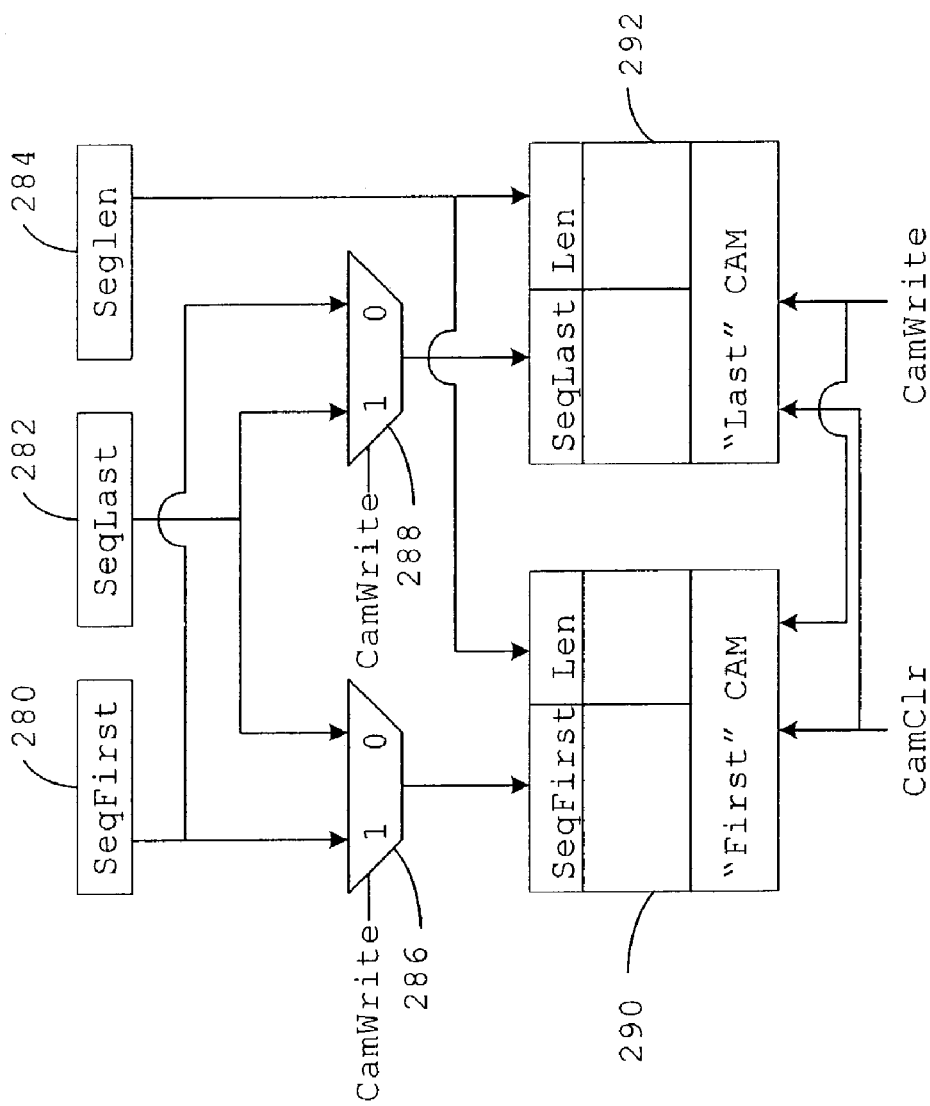
FIGS. 16-17 are schematics of a system to track out-of-order that includes content-addressable memory.
Figure 17:
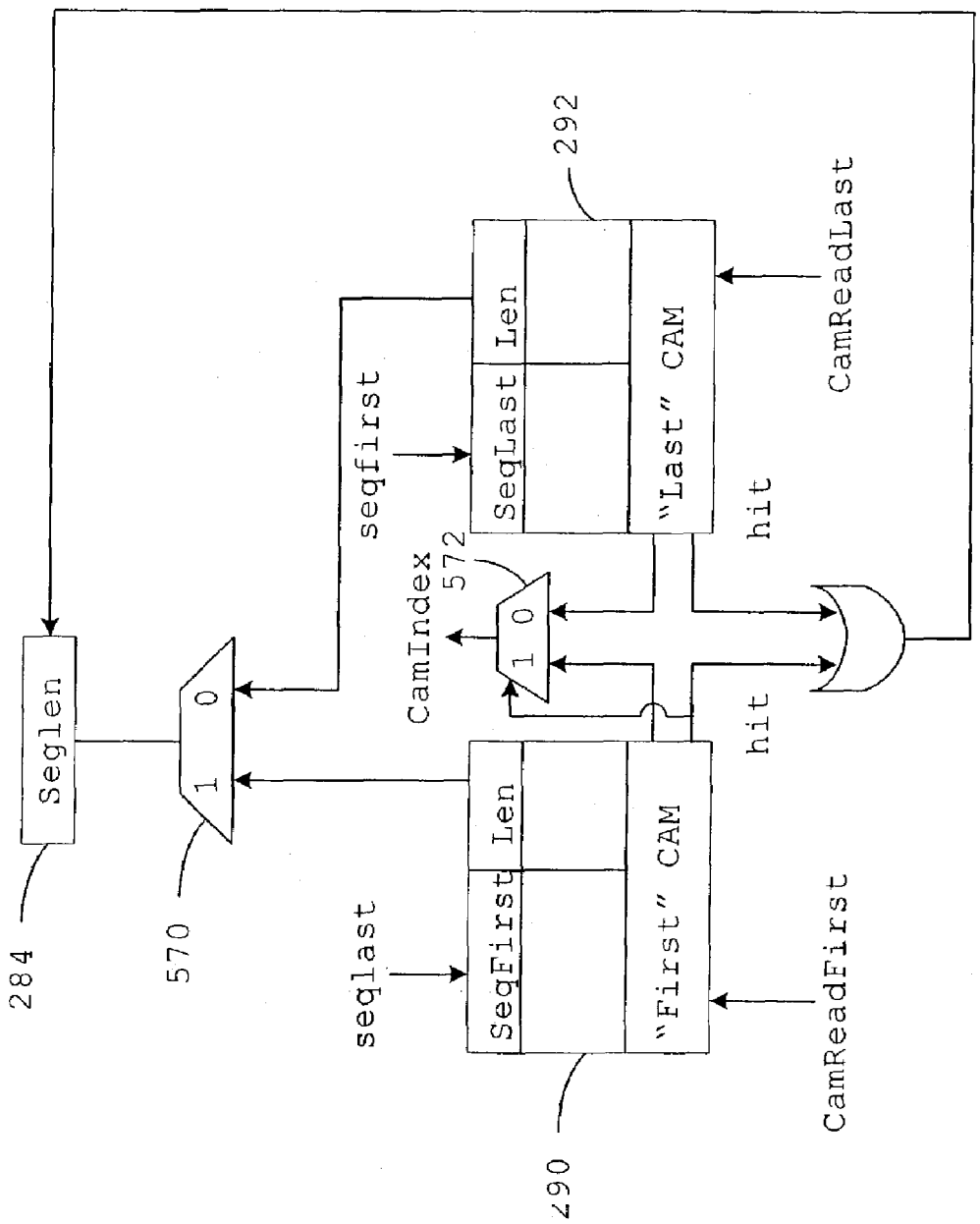

The packet tracking process illustrated above may be implemented using a wide variety of hardware, firmware, and/or software. For example, FIGS. 16 and 17 depict a hardware implementation of the scheme described above. As shown in these figures, the implementation features two content-addressable memories 290, 292—one 290 stores the first sequence number of an out-of-order packet chain as the key and the other 292 stores the last+1 sequence number of the chain as the key. As shown, both CAMs 290, 292 also store the length of chain.

Other implementations may use a single CAM. Still other implementations use address-based memory or other data storage instead of content-addressable memory.

Potentially, the same CAM(s) 290, 292 can be used to track packets of many different connections. In such cases, a connection ID may be appended to each CAM entry as part of the key to distinguish entries for different connections. The merging of packet information into chains in the CAM(s) 290, 292 permits the handling of more connections with smaller CAMs 290, 292.

As shown in FIG. 16, the implementation includes registers that store a starting sequence number 280, ending sequence number 282, and a data length 284. The engine 100 processor 170 shown in FIG. 5 may access these registers 280, 282, 284 to track packets. For example, the may request a next expected sequence number to include in an acknowledgement message sent back to the sender.

As shown, the implementation operates on control signals for reading from the CAM(s) 290, 292 (CAMREAD), writing to the CAMs 290, 292 (CAMWRITE), and clearing a CAM 290, 292 entry (CAMCLR). As shown in FIG. 17, the hardware may be configured to simultaneously write register values to both CAMs 290, 292 when the registers 290, 292, 294 are loaded with data. As shown in FIG. 17, for "hits" for a given start or end sequence number, the circuitry sets the "seglen" register to the length of a matching CAM entry. Circuitry (not shown) may also set the values of the "seqfirst" 280 and "seqlast" 282 registers after a successful CAM 290, 292 read operation. The circuitry may also provide a "CamIndex" signal that identifies a particular found entry in the CAM(s) 290, 292.

To implement the packet tracking approach described above, a tracking sub-system may feature its own independent controller that executes instructions implementing the scheme or may feature hard-wired logic. Alternately, processor 170 (FIG. 5) may include instructions for the scheme. Potentially, the processor 170 instruction set (FIG. 8) may be expanded to include commands that access the CAMs 290, 292. Such instructions may include instructions to write data to the CAM(s) 290, 292 (e.g., CAM2FirstWR key<--data for CAM 290 and CAM2LastWR key<--data for CAM 292); instructions to read data from the CAM(s) (e.g., CAM2FirstRD key-->data and CAM2LastRD key-->data); instructions to clear CAM entries (e.g., CAM2CLR key), and/or instructions to generate a condition value if a lookup failed (e.g., CAM2EMPTY-->cond).

Potentially, the engine 100 components may be clocked at the same rate. A clock signal essentially determines how fast a logic network will operate. Unfortunately, due to the fact that many instructions may be executed for a given packet, to operate at wire-speed, the engine 100 might be clocked at a very fast rate far exceeding the rate of the connection. Running the entire engine 100 at a single very fast clock can both consume a tremendous amount of power and generate high temperatures that may affect the behavior of heat-sensitive silicon.

Instead, engine 100 components may be clocked at different rates. As an example, the sequencer 162 may be clocked at a rate, "1×", corresponding to the speed of the network connection. Since the processor 170 may be programmed to execute a number of instructions to perform appropriate network protocol operations for a given packet, processing components may be clocked at a faster rate than the sequencer 162. For example, components in the processing logic may be clocked at some multiple "k" of the sequencer 162 clock frequency where "k" is sufficiently high to provide enough time for the processor 170 to finish executing instructions for the packet without falling behind wire speed. Engines 100 using the "dual-clock" approach may feature devices known as "synchronizers" (not shown) that permit differently clocked components to communicate.

As an example of a "dual-clock" system, for an engine having an input data width of 16-bits, to achieve 10-gigabits per second, the sequencer 162 should be clocked at a frequency of 625 MHz (e.g., [16-bits per cycle]×[625,000,000 cycles per second]=10,000,000,000 bits per second). Assuming a smallest packet of 64 bytes (e.g., a packet only having IP and TCP headers, frame check sequence, and hardware source and destination addresses), it would take the 16-bit/625 MHz interface 108 32-cycles to receive the packet bits. Potentially, an inter-packet gap may provide additional time before the next packet arrives. If a set of up to n instructions is used to process the packet and a different instruction can be executed each cycle, the processing block 110 may be clocked at a frequency of k·(625 MHz) where k=n-instructions/32-cycles. For implementation convenience, the value of k may be rounded up to an integer value or a value of $2^n$ though this is not a strict requirement.

Since components run by a faster clock generally consume greater power and generate more heat than the same components run by a slower clock, clocking engine components at different speeds according to their need can enable the engine 100 to save power and stay cooler. This can both reduce the power requirements of the engine 100 and can reduce the need for expensive cooling systems.

Power consumption and heat generation can potentially be reduced even further. That is, instead of permanently tailoring the system 106 to handle difficult scenarios, engine compontents may be clocked at speeds that dynamically vary based on one or more packet characteristics. For example, an engine 100 may use data identifying a packet's size (e.g., the length field in the IP datagram header) to scale the clock frequency of processing components. For instance, for a bigger packet, the processor 170 has more time to process the packet before arrival of the next packet, thus, the frequency could be lowered without falling behind wire-speed. Likewise, for a smaller packet, the frequency may be increased. Adaptively scaling the clock frequency "on the fly" for different incoming packets can reduce power by reducing operational frequency when processing larger packets. This can, in turn, result in a cooler running system that may avoid the creation of silicon "hot spots" and/or expensive cooling systems.

Thus, scaling logic can receive packet data and correspondingly adjusts the frequency provided to the processing logic. While discussed above as operating on the packet size, a wide variety of other metrics may be used to adjust the frequency such as payload size, quality of service (e.g., a higher priority packet may receive a higher frequency), protocol type, and so forth. Additionally, instead of the characteristics of a single packet, aggregate characteristics may be used to adjust the clock rate (e.g., average size of packets received). To save additional power, the clock may be temporarily disabled when the network is idle.

Figure 18:
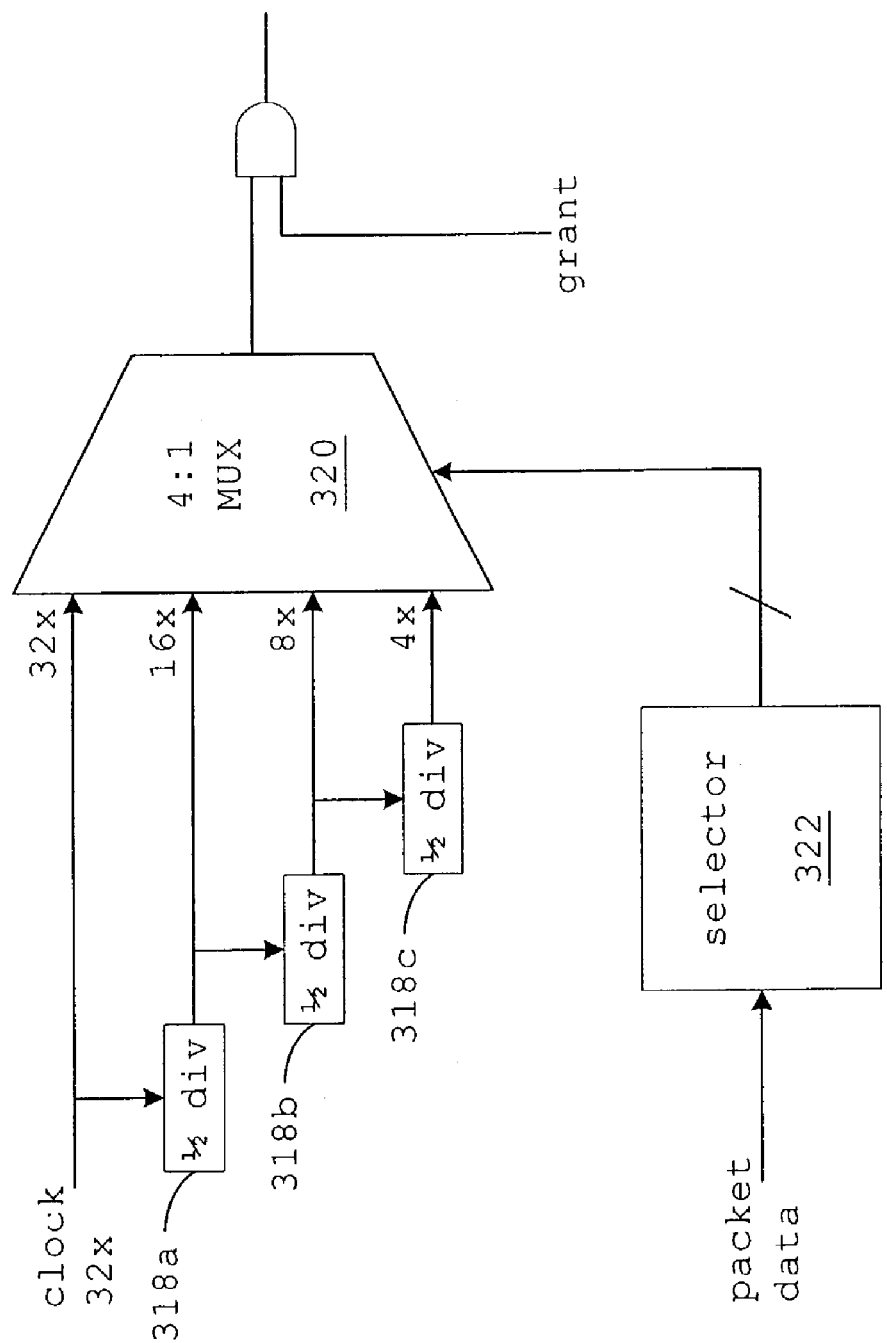
FIG. 18 is a diagram of a mechanism for providing a clock signal.

The scaling logic may be implemented in wide variety of hardware and/or software schemes. For example, FIG. 18 depicts a hardware scheme that uses dividers 318a-318c to offer a range of available frequencies (e.g., 32x, 16x, 8x, and 4x). The different frequency signals are fed into a multiplexer 320 for selection based on packet characteristics. For example, a selector 322 may feature a magnitude comparator that compares packet size to different pre-computed thresholds. For example, a comparator may use different frequencies for packets up to 64 bytes in size (32x), between 64 and 88 bytes (16x), between 88 and 126 bytes (8x), and 126 to 236 (4x). While FIG. 18 illustrates four different clocking signals, other implementations may feature n-clocking signals. Additionally, the relationship between the different frequencies provided need not be uniform fractions of one another as shown in FIG. 18.

The resulting clock signal can be routed to different components within the engine 100. For example, the input sequencer 116 may receives a "1x" clock signal while the processor 122 receives dynamically determined "kx" clock signal". The connection data memory 112 and CAM 114 may receive the "1x" or the "kx" clock signal, depending on the implementation.

As shown, the clock signal may be AND-ed with a grant signal received from an engine controller. Again, this can conserve power and reduce heat generation when the engine is not needed. Placing the scaling logic physically near a frequency source can also reduce power consumption. Further, adjusting the clock at a global clock distribution point both saves power and reduces logic need to provide clock distribution.

Figure 19:
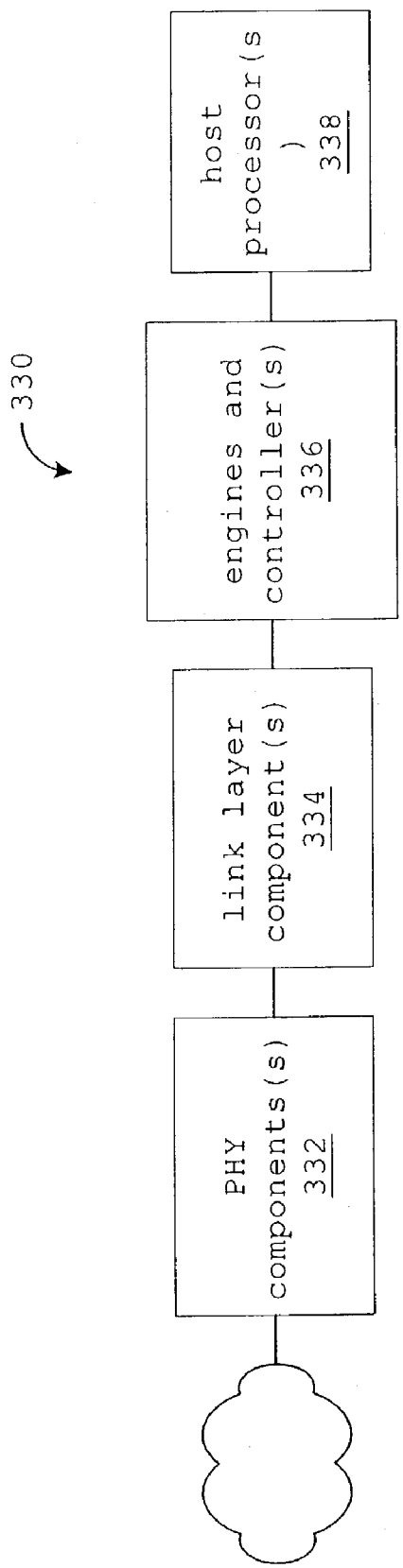
FIG. 19 is a diagram of a network device including a collection of off-load engines.

FIG. 19 depicts a sample system 330 using aggregations of off-load engines. The system 330 includes one or more physical layer devices (PHY) 332 that handle signal transmission and reception over a transmission medium (e.g., a copper wire, optic-fiber, or wireless). The system 330 may also include one or more link layer 334 devices (e.g., an Ethernet medium access control (MAC) or Synchronous Optical Network (SONET) framer). As shown, the system 330 includes an aggregation of off-load engines 336 to process data received via the PHY 332 and link layer 334 devices on behalf of host processor(s) 338.

Again, a wide variety of implementations may use one or more of the techniques described above. Additionally, the engine/controllers 336 may appear in a variety of products. For example, the components 336 may be designed as a single chip. Potentially, such a chip may be included in a chipset or on a motherboard. Further, the components 336 may be integrated into components such as a storage area network components (e.g., a storage switch), application server, network adaptor, NIC (Network Interface Card), or MAC (medium access device), or a micro-processor.

Aspects of techniques described herein may be implemented using a wide variety of hardware and/or software configurations. For example, the techniques may be implemented in computer programs. Such programs may be stored on computer readable media and include instructions for programming a processor (e.g., a controller or engine processor).

Other embodiments are within the scope of the following claims.

APPENDIX A

```
END:        TCBWR index
IDLE:       JMP IDLE
LBLLISTEN:       SUB rcv[len], HEADERLEN --> seglen
            AND rcv[code], RST --> cond
            BRNEQZ IDLE
            AND rcv[code], ACK --> cond
            BRNEQZ TCPRST
            AND rcv[code], SYN --> cond
            BRNEQZ TCPINITWIN
            JMP TCPRST
LBLLISTEN1:      LOAD wkreg[state] <-- SYNRCVD
            JMP END
LBLSYNRCVD:      JMP TCPSEQOK
LBLSYNRCVD1:     AND rcv[code], ACK --> cond
            BREQZ IDLE
            CMP wkreg[suna], rcv[ack] --> cond
            BRNEQZ TCPRST
            CMP rcv[ack], wkreg[snext] --> cond
            BRNEQZ TCPRST
            ADD wkreg[suna], 1 --> wkreg[suna]
            JMP TCPDATAPROC
LBLSYNRCVD4:     AND wkreg[flags], RDONE --> R0
            EQUAL R0, 0 --> cond
            BRNEQZ LBLSYNRCVD5
            LOAD wkreg[state] <-- CLOSEWAIT
            JMP END
LBLSYNRCVD5:     LOAD wkreg[state] <-- ESTABLISHED
            JMP END
LBLESTABLISHED:  JMP TCPSEQOK
LBLESTABLISHED4: CMP wkreg[rbcount], 75RBSIZE --> cond
            BREQZ LBLESTABLISHED5
            LOAD wkreg[rbcount] <-- 0
LBLESTABLISHED5: AND wkreg[flags], RDONE --> R0
            EQUAL R0, 0 --> cond
            BRNEQZ END
            LOAD wkreg[state] <-- CLOSEWAIT
            JMP END
LBLCLOSEWAIT:    JMP TCPSEQOK
LBLLASTACK:      JMP TCPSEQOK
LBLLASTACK2:     AND rcv[code], ACK --> cond
            BREQZ END
            CMP wkreg[suna], rcv[ack] --> cond
            BRNEQZ END
            CMP rcv[ack], wkreg[snext] --> cond
            BRNEQZ END
            JMP TCBDEALLOCATE
```

APPENDIX A-continued

```
TCPRST:      LOAD snd[window] <-- 0
             AND rcv[code], SYN --> cond
             BREQZ LBL02
             ADD seglen, 1 --> seglen
LBL02:       AND rcv[code], FIN --> cond
             BREQZ LBL03
             ADD seglen, 1 --> seglen
LBL03:       AND rcv[code], ACK --> cond
             BRNEQZ LBL00
             LOAD snd[seq] <-- 0
             LOAD snd[code] <-- RST|ACK
             JMP LBL01
LBL00:       MOV rcv[ack] --> snd[seq]
             LOAD snd[code] <-- RST
LBL01:       ADD rcv[seq], seglen --> snd[ack]
             EQUAL wkreg[state], LISTEN --> cond
             BRNEQZ IDLE
             EQUAL wkreg[state], SYNRCVD --> cond
             BREQZ TCBDEALLOCATE
             AND rcv[code], SYN --> cond
             BRNEQZ TCBDEALLOCATE
             JMP IDLE
TCBDEALLOCATE:   CAM1CLR index
             JMP IDLE
TCPINITWIN:  LOAD wkreg[code] <-- SYN
             MOV rcv[window] --> wkreg[swindow]
             MOV rcv[seq] --> wkreg[lwseq]
             MOV rcv[seq] --> wkreg[rnext]
             ADD rcv[seq], RBSIZE --> wkreg[cwin]
             JMP TCPDATAPROC
TCPSENDWIN:  CMP wkreg[lwseq], rcv[seq] --> cond
             BRNEQZ LBL11
             EQUAL rcv[seq], wkreg[lwseq] --> cond
             BREQZ LBL10
             CMP wkreg[lwack], rcv[ack] --> cond
             BRNEQZ LBL11
LBL10:       MOV rcv[window] --> wkreg[swindow]
             MOV rcv[seq] --> wkreg[lwseq]
             MOV rcv[ack] --> wkreg[lwack]
LBL11:       EQUAL wkreg[state], ESTABLISHED --> cond
             BRNEQZ LBLESTABLISHED4
             OR wkreg[flags], SNDFIN --> wkreg[flags]
             JMP TCPACK
TCPSEQOK:    LOAD statusok <-- 0
             SUB rcv[len], HEADERLEN --> seglen
             AND rcv[code], SYN --> cond
             BREQZ LBL20
             ADD seglen, 1 --> seglen
LBL20:       AND rcv[code], FIN --> cond
             BREQZ LBL21
             ADD seglen, 1 --> seglen
LBL21:       SUB RBSIZE, wkreg[rbcount] --> rwindow
             EQUAL rwindow, 0 --> cond
             BREQZ LBL22
             EQUAL seglen, 0 --> cond
             BREQZ LBL22
             EQUAL wkreg[rnext], rcv[seq] --> cond
             BREQZ LBL25
             LOAD statusok <-- 1
             JMP LBL25
LBL22:       EQUAL rwindow, 0 --> cond
             BREQZ LBL25
             ADD wkreg[rnext], rwindow --> seqwin
             ADD rcv[seq], seglen --> seqlast
             EQUAL seglen, 0 --> cond
             BRNEQZ LBL23
             CMP seqlast, wkreg[rnext] --> cond
             MOV cond --> statusok
             CMP seqlast, seqwin --> cond
             NOT cond --> cond
             AND cond, statusok --> statusok
LBL23:       CMP wkreg[rnext], rcv[seq] --> cond
             BRNEQZ LBL25
             CMP seqwin, rcv[seq] --> cond
             OR statusok, cond --> statusok
LBL25:       AND rcv[code], SYN --> cond
             BREQZ LBL26
             SUB seglen, 1 --> seglen
LBL26:       AND rcv[code], FIN --> cond
             BREQZ LBL27
             SUB seglen, 1 --> seglen
LBL27:       EQUAL statusok, 0 --> cond
             BRNEQZ TCPACKOUT
             AND rcv[code], RST --> cond
             BRNEQZ TCBDEALLOCATE
             AND rcv[code], SYN --> cond
             BRNEQZ TCPRST
             EQUAL wkreg[state], SYNRCVD --> cond
             BRNEQZ LBLSYNRCVD1
             JMP TCPACKIN
TCPACKOUT:   CMP seglen, 0 --> cond
             BRNEQZ LBL30
             AND rcv[code], SYN|FIN --> cond
             BREQZ IDLE
LBL30:       LOAD snd[code] <-- ACK
             MOV wkreg[snext] --> snd[seq]
             MOV wkreg[rnext] --> snd[ack]
             SUB RBSIZE, wkreg[rbcount] --> rwindow
             CMP wkreg[state], SYNRCVD --> cond
             BREQZ LBL35
             SHL2 rwindow --> R0
             CMP RBSIZE, R0 --> cond
             BRNEQZ LBL32
             CMP RMSS, rwindow --> cond
             BREQZ LBL33
LBL32:       LOAD rwindow <-- 0
LBL33:       CMP wkreg[cwin], wkreg[rnext] --> cond
             BREQZ LBL34
             SUB wkreg[cwin], wkreg[rnext] --> R0
             CMP rwindow, R0 --> cond
             BRNEQZ LBL34
             MOV R0 --> rwindow
LBL34:       ADD wkreg[rnext], rwindow --> wkreg[cwin]
LBL35:       MOV rwindow --> snd[window]
             JMP END
TCPACK:      AND wkreg[flags], SNDFIN --> R0
             EQUAL R0, 0 --> cond
             BRNEQZ LBL60
             OR wkreg[code], FIN --> wkreg[code]
LBL60:       OR wkreg[code], ACK --> snd[code]
             AND wkreg[flags], ~NEEDOUT --> wkreg[flags]
             MOV wkreg[snext] --> snd[seq]
             AND wkreg[code], SYN|FIN --> cond
             BREQZ LBL61
             ADD wkreg[snext], 1 --> wkreg[snext]
LBL61:       MOV wkreg[rnext] --> snd[ack]
             SUB RBSIZE, wkreg[rbcount] --> rwindow
             CMP wkreg[state], SYNRCVD --> cond
             BREQZ LBL65
             SHL2 rwindow --> R0
             CMP RBSIZE, R0 --> cond
             BRNEQZ LBL62
             CMP RMSS, rwindow --> cond
             BREQZ LBL63
LBL62:       LOAD rwindow <-- 0
LBL63:       SUB wkreg[cwin], wkreg[rnext] --> R0
             CMP rwindow, R0 --> cond
             BRNEQZ LBL64
             MOV R0 --> rwindow
LBL64:       ADD wkreg[rnext], rwindow --> wkreg[cwin]
LBL65:       MOV rwindow --> snd[window]
             AND wkreg[code], 0 --> wkreg[code]
             EQUAL wkreg[state], LISTEN --> cond
             BRNEQZ LBLLISTEN1
             EQUAL wkreg[state], SYNRCVD --> cond
             BRNEQZ LBLSYNRCVD4
             EQUAL wkreg[state], ESTABLISHED --> cond
             BRNEQZ TCPSENDWIN
             EQUAL wkreg[state], CLOSEWAIT --> cond
             BREQZ END
             LOAD wkreg[state] <-- LASTACK
             JMP END
```

APPENDIX A-continued

```
TCPACKIN:     AND rcv[code], ACK --> cond
              BREQZ LBL41
              CMP rcv[ack], wkreg[suna] --> cond
              BREQZ IDLE
              CMP rcv[ack], wkreg[snext] --> cond
              BRNEQZ TCPACKOUT
              MOV rcv[ack] --> wkreg[suna]
              AND wkreg[code], SYN --> cond
              BREQZ LBL40
              AND wkreg[code], ~SYN --> wkreg[code]
              AND wkreg[flags], ~FIRSTSEND --> wkreg[flags]
LBL40:        AND wkreg[code], FIN --> cond
              BREQZ LBL41
              EQUAL wkreg[snext], rcv[ack] --> cond
              BREQZ LBL41
              AND wkreg[code], ~FIN --> wkreg[code]
              AND wkreg[flags], ~SNDFIN --> wkreg[flags]
LBL41:        EQUAL wkreg[state], CLOSEWAIT --> cond
              BRNEQZ TCPSENDWIN
              EQUAL wkreg[state], ESTABLISHED --> cond
              BRNEQZ TCPDATAPROC
              EQUAL wkreg[state], LASTACK --> cond
              BRNEQZ LBLLASTACK2
              JMP END
TCPDATAPROC:  MOV rcv[code] --> statusok
              MOV rcv[seq] --> seqfirst
              AND statusok, URG --> cond
              BREQZ LBL51
              ADD seqfirst, rcv[urgptr] --> R0
              AND wkreg[flags], RUPOK --> rwindow
              EQUAL rwindow, 0 --> cond
              BRNEQZ LBL50
              CMP R0, wkreg[rupseq] --> cond
              BREQZ LBL51
LBL50:        MOV R0 --> wkreg[rupseq]
              OR wkreg[flags], RUPOK --> wkreg[flags]
LBL51:        AND statusok, SYN --> cond
              BREQZ LBL52
              ADD wkreg[rnext], 1 --> wkreg[rnext]
              OR wkreg[flags], NEEDOUT --> wkreg[flags]
              ADD seqfirst, 1 --> seqfirst
LBL52:        SUB RBSIZE, wkreg[rbcount] --> rwindow
              ADD wkreg[rnext], rwindow --> seqwin
              ADD seqfirst, seglen --> seqlast
              CMP wkreg[rnext], seqfirst --> cond
              BREQZ LBL53
              SUB wkreg[rnext], seqfirst --> R0
              SUB seglen, R0 --> seglen
              MOV wkreg[rnext] --> seqfirst
LBL53:        CMP seqlast, seqwin --> cond
              BREQZ LBL54
              SUB seqlast, seqwin --> R0
              SUB seglen, R0 --> seglen
              AND statusok, ~FIN --> statusok
LBL54:        EQUAL seqfirst, wkreg[rnext] --> cond
              BREQZ LBL55
              CMP seglen, 0 --> cond
              BREQZ LBL56
              ADD wkreg[rnext], seglen --> wkreg[rnext]
              ADD wkreg[rbcount], seglen --> wkreg[rbcount]
LBL512:       CAM2EMPTY cond
              BRNEQZ LBL511
              CAM2LLKUP seqlast
              BREQZ LBL511
              CAM2CLR [cam2_idx]
              ADD wkreg[rnext], seglen --> wkreg[rnext]
              ADD wkreg[rbcount], seglen --> wkreg[rbcount]
LBL511:       EQUAL wkreg[finseq], wkreg[rnext] --> cond
              BRNEQZ ALLDONE
              CMP wkreg[pushseq], wkreg[rnext] --> cond
              BRNEQZ NEXT
              OR statusok, PSH --> statusok
              LOAD wkreg[pushseq] <-- 0
              JMP NEXT
ALLDONE:      OR statusok, FIN --> statusok
NEXT:         OR wkreg[flags], NEEDOUT --> wkreg[flags]
LBL56:        AND statusok, FIN --> cond
              BREQZ LBL58
              OR wkreg[flags], RDONE|NEEDOUT --> wkreg[flags]
              ADD wkreg[rnext], 1 --> wkreg[rnext]
LBL58:        AND statusok, PSH|URG --> cond
              BREQZ NEXTP1
              OR wkreg[flags], PUSH --> wkreg[flags]
              JMP NEXTP1
LBL55:        AND statusok, FIN --> cond
              BREQZ LBL59
              ADD seqfirst, seglen --> wkreg[finseq]
LBL59:        AND statusok, PSH|URG --> cond
              BREQZ LBL510
              ADD seqfirst, seglen --> wkreg[pushseq]
LBL510:       AND statusok, ~(FIN|PSH) --> statusok
              CAM2LLKUP seqlast
              BREQZ LBL515
              CAM2CLR [cam2_idx]
              ADD seqlast, seglen --> seqlast
              SUB seqlast, seqfirst --> seglen
LBL515:       CAM2RLKUP seqfirst
              BREQZ LBL516
              CAM2CLR [cam2_idx]
              SUB seqfirst, seglen --> seqfirst
              SUB seqlast, seqfirst --> seglen
LBL516:       CAM2WR seglen
              OR wkreg[flags], NEEDOUT --> wkreg[flags]
NEXTP1:       AND wkreg[flags], NEEDOUT --> R0
              EQUAL R0, 0 --> cond
              BREQZ TCPACK
              EQUAL wkreg[state], LISTEN --> cond
              BRNEQZ LBLLISTEN1
              EQUAL wkreg[state], SYNRCVD --> cond
              BRNEQZ LBLSYNRCVD4
              EQUAL wkreg[state], ESTABLISHED --> cond
              BRNEQZ TCPSENDWIN
              JMP END
```

What is claimed is:

1. A method of processing a received packet, the method comprising:
  identifying a network connection of the received packet; and
  allocating the network connection to a one of a set of multiple network protocol off-load engines comprising minimizing the number of network protocol off-load engines currently allocated at least one connection.

2. The method of claim 1,
  wherein the connection comprises a Transport Control Protocol (TCP) connection; and
  wherein at least one of the network protocol off load engines comprises a TCP off-load engine.

3. The method of claim 1, wherein the connection comprises a transport layer connection.

4. The method of claim 1, wherein the allocating comprises allocating based on at least one signal from at least one of the engines identifying the engine's current usage.

5. The method of claim 1, wherein the allocating comprises storing data for the connection.

6. The method of claim 5, wherein the data comprises a source address, destination address, source port, and destination port.

7. The method of claim 1, wherein the allocating comprises maintaining a queue of engines allocated a first connection.

8. The method of claim 1, further comprising asserting a signal to a one of the multiple network protocol off-load engines allocated for the connection of a received packet.

9. The method of claim 8, further comprising performing network protocol operations on the packet with the network protocol off-load engine allocated to the connection.

10. The method of claim 1, further comprising
asserting a signal to network protocol off-load engines allocated to at least one on-going connection; and;
receiving signals from the network protocol off-load engines receiving the signal that identify which, if any, of the network protocol off-load engines has been allocated to the connection of the packet.

11. A network protocol off-load engine, the engine comprising:
an input interface to receive packet data;
an output interface to output results of network protocol operations;
a controller interface to communicate with a controller of multiple network protocol off-load engines; and
logic to:
perform network protocol operations on received packet data;
assert at least one signal to the controller identifying network protocol off-load engine usage: and
communicate with the controller by, at least, receiving a signal when the engine has been allocated to process a connection of a received packet.

12. The engine of claim 11, wherein the network protocol operations comprise Transport Control Protocol (TCP) operations.

13. The engine of claim 11, wherein the output interface comprises an interface to a bus shared by the multiple network protocol off-load engines.

14. The engine of claim 11, wherein the engine comprises storage and logic to store data identifying a connection allocated to the engine.

15. The engine of claim 14, wherein the storage comprises a content addressable memory (CAM).

16. The engine of claim 14, further comprising logic to assert a signal to the controller indicating that a lookup of a connection in the storage succeeded.

17. The engine of claim 11, wherein the at least one signal comprises at least one of the following: a network protocol off-load engine full signal and a network protocol off-load engine empty signal.

18. The engine of claim 11, wherein the logic comprises a processor and storage storing instructions to perform network protocol operations.

19. The engine of claim 11, wherein the at least one signal enables the engine to perform network protocol operations on the received packet data.

20. A controller, the controller comprising:
at least one interface to a set of multiple network protocol off-load engines; and
logic to allocate a network connection to a one of a set of multiple network protocol off-load engines comprising logic to minimize the number of off-load engines currently allocated at least one connection.

21. The controller of claim 20,
wherein the connection comprises a Transport Control Protocol (TCP) connection; and
wherein at least one of the network protocol off-load engines comprises a TCP off-load engine.

22. The controller of claim 20, wherein the allocating comprises allocating based on signals received from at least one of the engines, the signals identifying the at least one engines' respective usage.

23. The controller of claim 20, further comprising logic to assert a signal only to an engine allocated for the connection of a received packet.

24. The controller of claim 20, further comprising logic to:
assert a signal only to engines allocated to at least one on-going connection; and;
receive signals from the engines receiving the signal that identify which, if any, of the engines has been allocated to a connection of a packet.

25. The controller of claim 20,
further comprising an interface to communicate with a hierarchically higher controller.

26. A system, comprising:
multiple network protocol off-load engines, the engines to perform network protocol operations on received packet data;
at least one controller coupled to at least a sub-set of the multiple network protocol off-engines;
a first bus to carry data of received packets to the multiple network protocol off-load engines; and
a second bus to carry results of engine processing of the received packets from the multiple network protocol off-load engines.

27. The system of claim 26, wherein the multiple network protocol off-load engines comprise at least one Transport Control Protocol (TCP) off-load engine.

28. The system of claim 26, wherein the controller coordinates access to the second bus.

29. The system of claim 26, wherein the controller comprises logic to allocate a network connection to a one of the multiple network protocol off-load engines.

30. The system of claim 29, wherein the logic to allocate comprises logic to minimize a number of engines allocated to at least one on-going connection.

31. The system of claim 26, wherein the controller and the multiple network protocol off-load engines communicate using at least one of the following signals: a usage signal sent from an engine to the controller that identifies usage of an engine, a grant signal sent by the controller to at least one engine, and a signal sent from an engine to the controller indicating that the engine has been allocated to the connection of a packet.

32. The system of claim 26, wherein the multiple network protocol off-load engines store data identifying connections allocated to the respective engines.

33. The system of claim 26, further comprising at least one hierarchical controller to coordinate operation of multiple ones of the at least one controller, individual ones of the at least one controller coupled to a different sub-set of the multiple network protocol off-load engines.

34. The system of claim 33, wherein the hierarchical controller comprises logic to allocate a connection to the multiple network protocol off-load engines managed by a one of the of the at least one controllers.

35. A system, comprising:
at least one physical layer component (PHY);
at least one Ethernet medium access controller (MAC) coupled to the at least one PHY;
at least one host system, the host system comprising:
at least one host processor; and
memory accessible by the host processor(s); and
an Transport Control Protocol (TCP) off-load sub-system coupled to the at least one Ethernet MAC and the at least one host system, TCP off-load sub-system comprising:
multiple TCP off-load engines to perform TCP operations on received packets; and
at least one controller, the at least one controller comprising logic to allocate a connection to a one of the multiple network protocol off-load engines.

36. The system of claim 35, wherein the at least one controller and at least one of the network protocol off-load engines communicate using at least one of the following signals: a usage signal sent from an engine to the controller that identifies usage of an engine, a grant signal sent by the controller to at least one engine, and a signal sent from an engine to the controller indicating that the engine has been allocated to the connection of a packet.

37. The system of claim 35,
   further comprising at least one hierarchical controller; and
   wherein the at least one hierarchical controller and the at least one controller communicate using at least one of the following signals: a usage signal sent from the controller to the hierarchically higher controller that identifies usage of network protocol off-load engines coupled to the controller, a grant signal sent by the hierarchically higher controller to the controller, and a signal sent from the controller to the hierarchically higher controller indicating that a network protocol off-load engine coupled to the controller has been allocated to the connection of a packet.

* * * * *

UNITED STATES PATENT AND TRADEMARK OFFICE
CERTIFICATE OF CORRECTION

PATENT NO. : 7,324,540 B2 Page 1 of 1
APPLICATION NO. : 10/334733
DATED : January 29, 2008
INVENTOR(S) : Vangal et al.

It is certified that error appears in the above-identified patent and that said Letters Patent is hereby corrected as shown below:

On the title page, item (75), in "Inventors", in column 1, line 1, delete "Aloha," and insert -- Portland, --, therefor.

In column 20, line 47, in Claim 2, delete "off load" and insert -- off-load --, therefor.

In column 21, line 19, in Claim 11, delete "usage:" and insert -- usage; --, therefor.

Signed and Sealed this

Eighth Day of July, 2008

JON W. DUDAS
*Director of the United States Patent and Trademark Office*